United States Patent [19]
Tabata et al.

[11] Patent Number: 5,461,132
[45] Date of Patent: Oct. 24, 1995

[54] ORGANIC MAGNETIC MEMBER, ORGANIC FERROMAGNETIC MEMBER, AND PROCESS FOR PRODUCING THE SAME, AND TIME-RESPONSIBLE ORGANIC FERROMAGNETIC MEMBER AND PROCESS FOR CONTROLLING DEVELOPMENT OF FERROMAGNETISM

[75] Inventors: Masayoshi Tabata; Kazuaki Yokota, both of Sapporo; Yoko Yoshinaga, Machida; Fumio Kishi; Norio Kaneko, both of Atsugi; Nobuo Kushibiki, Yamato, all of Japan

[73] Assignee: Canon Kabushiki Kaisha, Tokyo, Japan

[21] Appl. No.: 205,340

[22] Filed: Mar. 3, 1994

Related U.S. Application Data

[63] Continuation of Ser. No. 764,962, Sep. 25, 1991, abandoned, which is a continuation of Ser. No. 590,960, Oct. 1, 1990, abandoned.

[30] Foreign Application Priority Data

Sep. 29, 1989 [JP] Japan ..................................... 1-255531

[51] Int. Cl.$^6$ ..................................................... C08F 38/00
[52] U.S. Cl. ........................ 526/285; 526/265; 526/251; 252/62.54
[58] Field of Search ........................ 252/62.54; 526/285, 526/265, 251

[56] References Cited

U.S. PATENT DOCUMENTS 5,135,673  8/1992  Murata et al. ....................... 252/62.54

FOREIGN PATENT DOCUMENTS 0067380 12/1982 Germany.
0195122  9/1986 European Pat. Off..
60-63212  4/1985 Japan.
63-275614 11/1988 Japan.

OTHER PUBLICATIONS

Van Nostrand's Scientific Encyclopedia, 7th Ed., 1989, p. 819.
R T Morrison and R N Boyd "Organic Chemistry", 3rd Ed Allyn & Bacon, Boston, 1973, p. 360.
K. Hasegawa et al. (1975) Macromol. 8, 255–259.
H. Iwamura et al. (1989) Mol. Cryst. Liq. Cryst. 176, 33–48.
Y. V. Korshak et al. (1987) Nature 326, 370∝372.
AN Chuvyrov et al. (1989) Sov. Phys Solid State 31 (3), 351–354.
N. Yoshioka et al., "Magnetic Interaction Observed in the Polyacetylenic Derivatives with High Spin Concentration," *Molcular Crystals and Liquid Crystals,* vol. 190, Oct. 1990, pp. 45–53.
H. Nishide et al., "Poly[(3,5–di–tert–butyl–4–hydroxyphenyl)–acetylene]: Formation of Conjugated Stable Polyradical," *Macromolecules,* vol. 21, 1988, pp. 3119–3120.
World Patents Index Latest, Derwent Publications Ltd., London, GB; AN 89–374138 & JP–A–1 270 910 (Tsuchida) & Chemical Abstracts 122 (1990), May 14, No. 20, Columbus, Ohio, U.S., 180093v.
World Patents Index Latest, Derwent Publications ltd., London, GB; AN 88–365168 & JP–A–63 275 614 (Mitsubishi Chem.).
T. Matsuda, "Polymerization of 1–Phenyl–1–alkynes by Halides of Niobium and Tantalum," *Macromolecules,* vol. 18, No. 3, Mar. 1985, pp. 311–316.

*Primary Examiner*—Mark Nagumo
*Attorney, Agent, or Firm*—Fitzpatrick, Cella, Harper & Scinto

[57] ABSTRACT

An organic magnetic member comprises repetition units represented by the following general formula [I]:

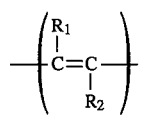

having at least one of $R_1$ and $R_2$ which is a substituted or unsubstituted aromatic ring, or a substituted or unsubstituted heterocyclic ring, and being spontaneously magnetized.

10 Claims, 21 Drawing Sheets

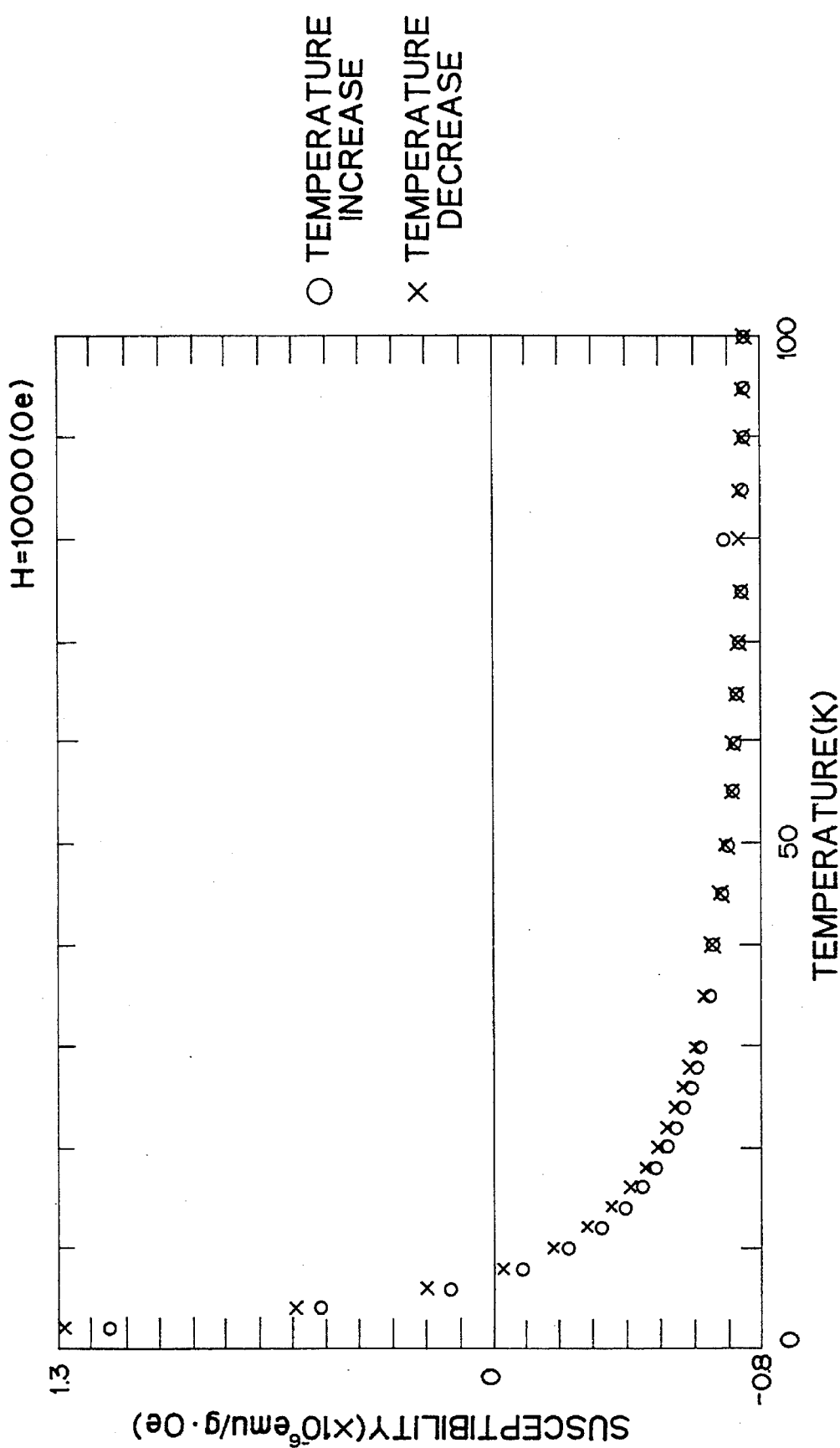

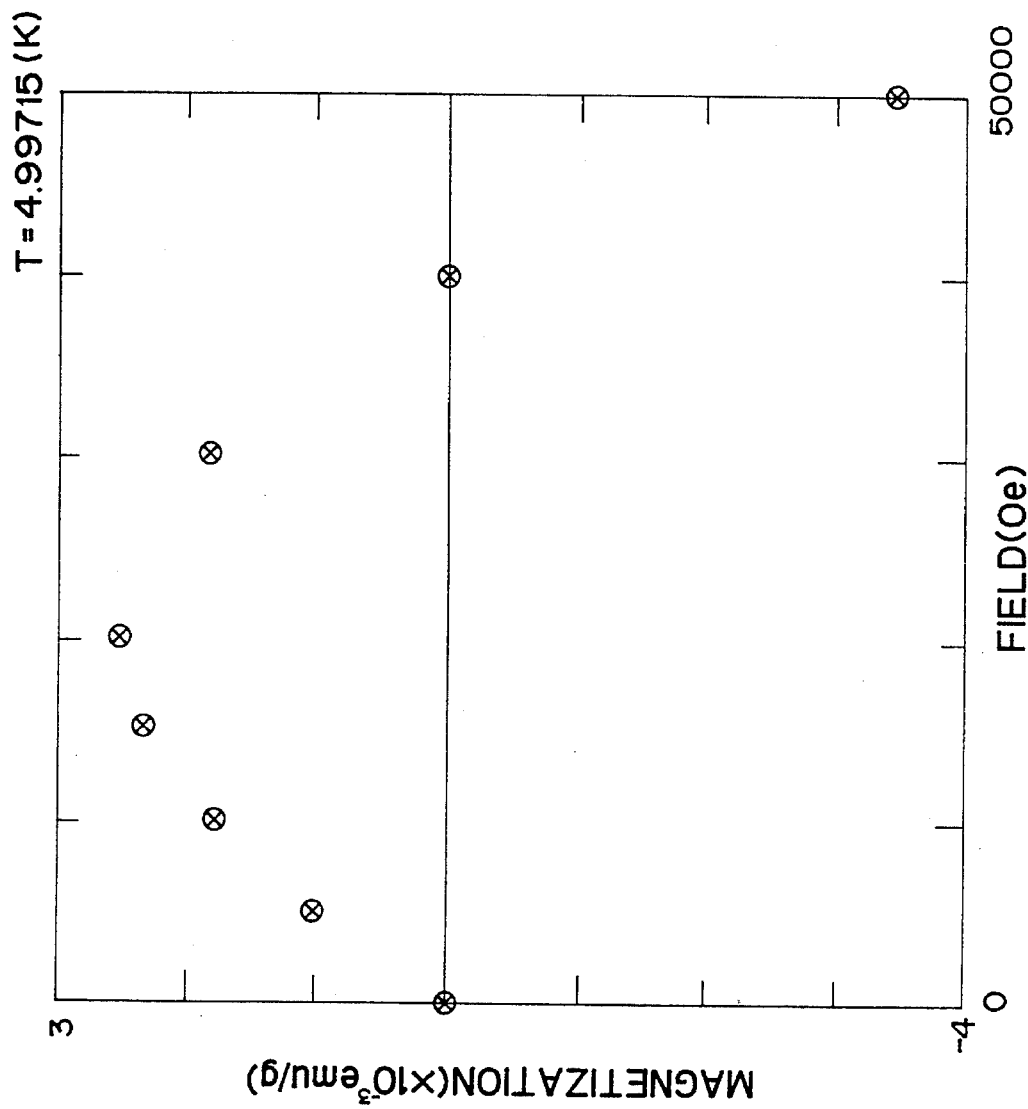

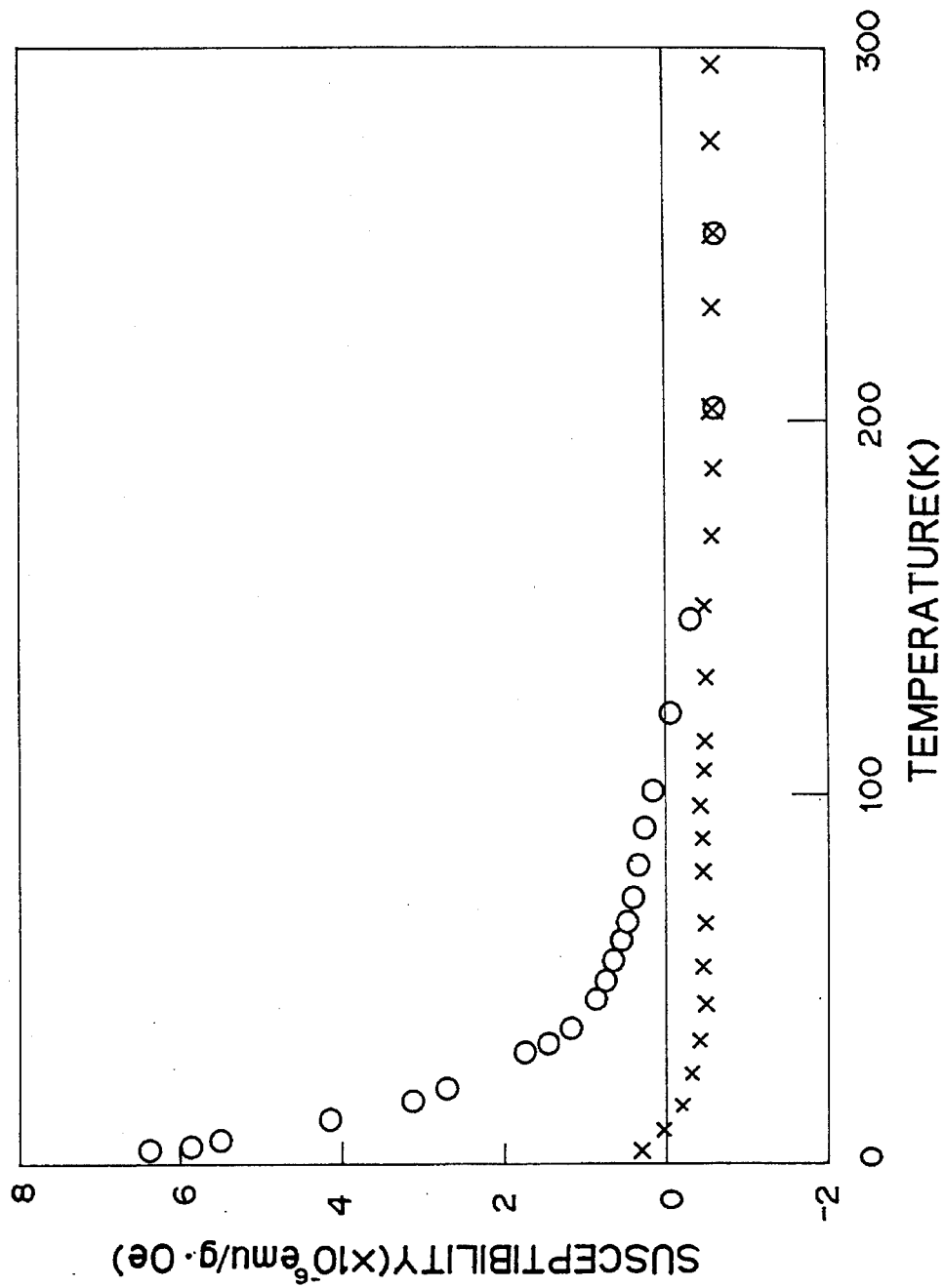

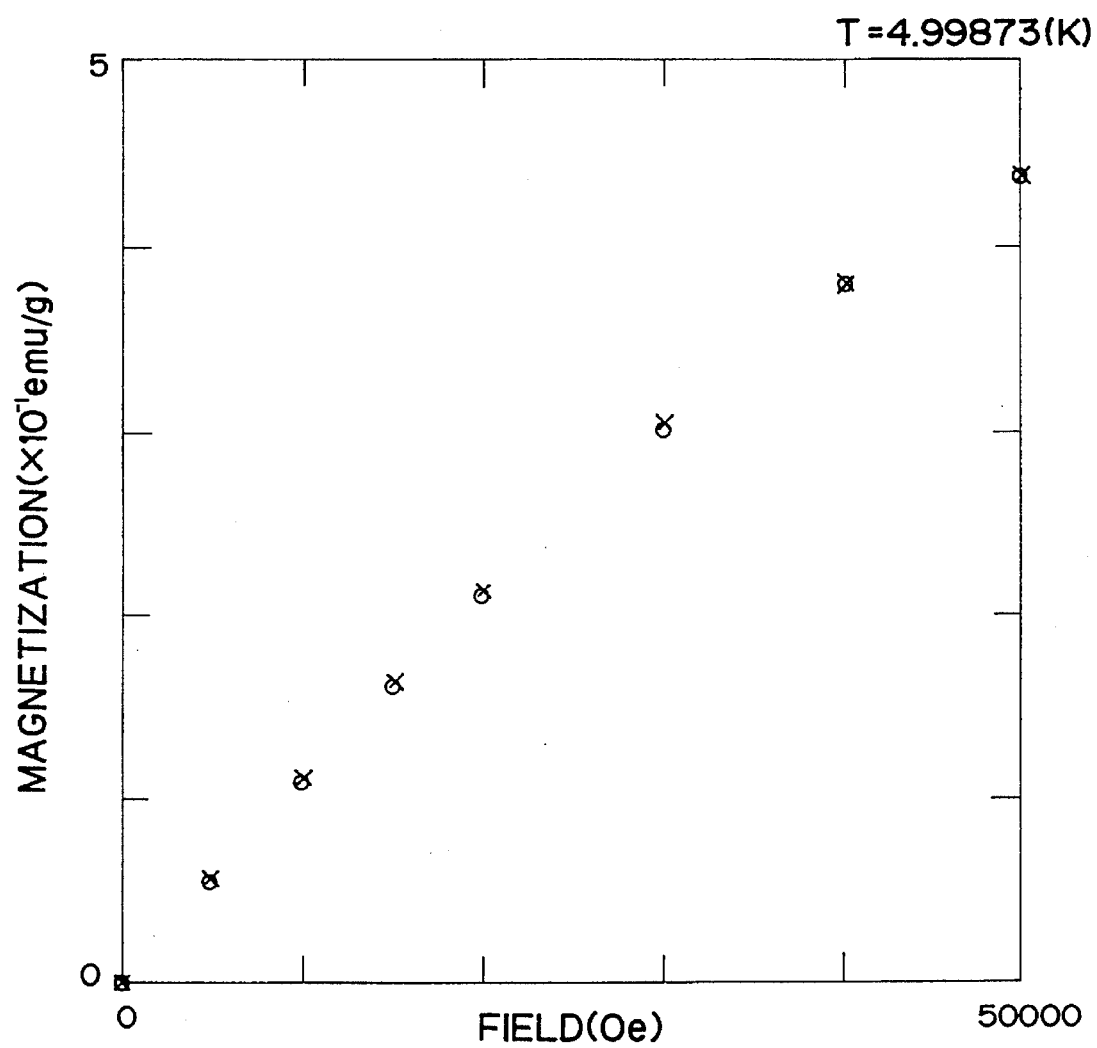

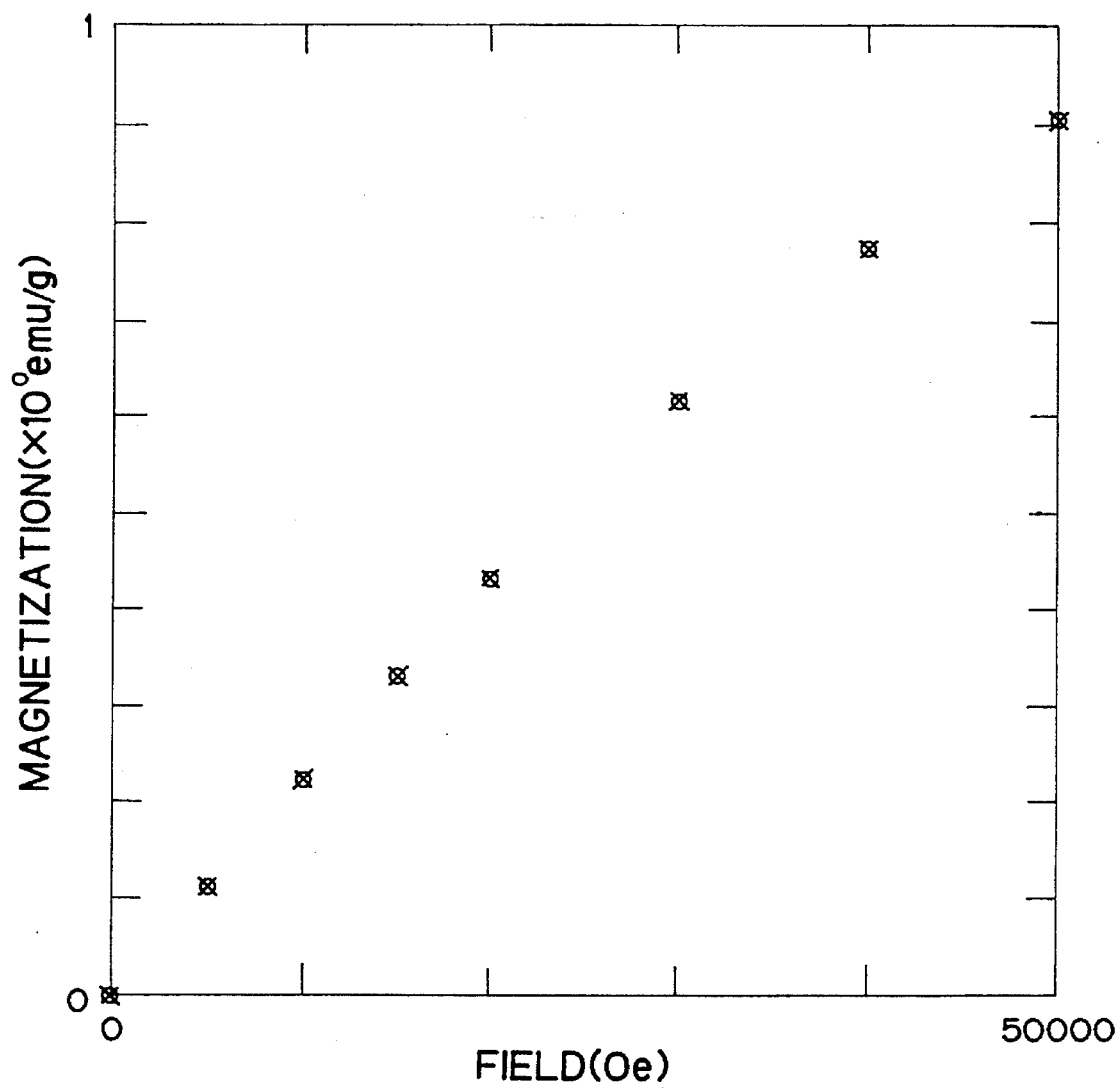

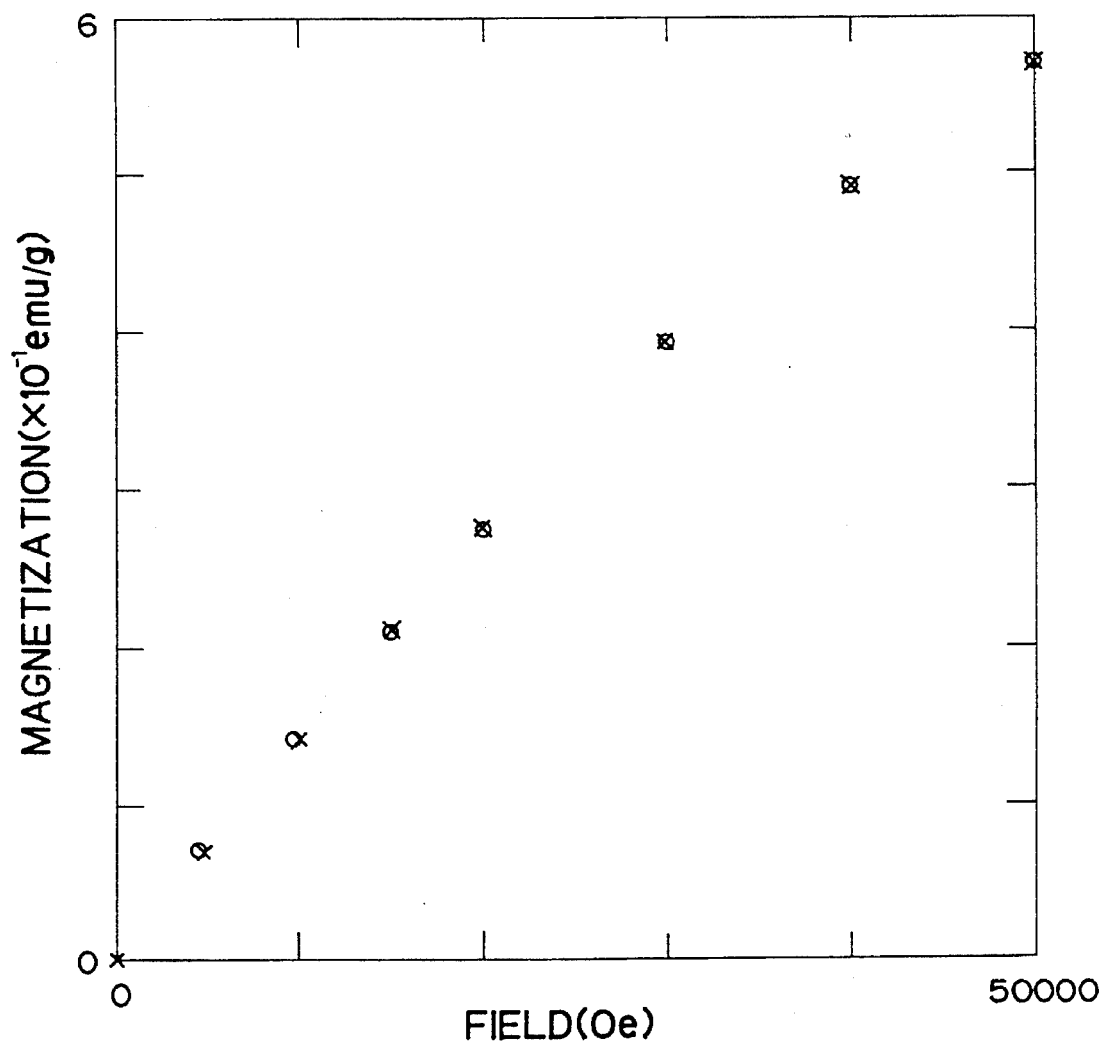

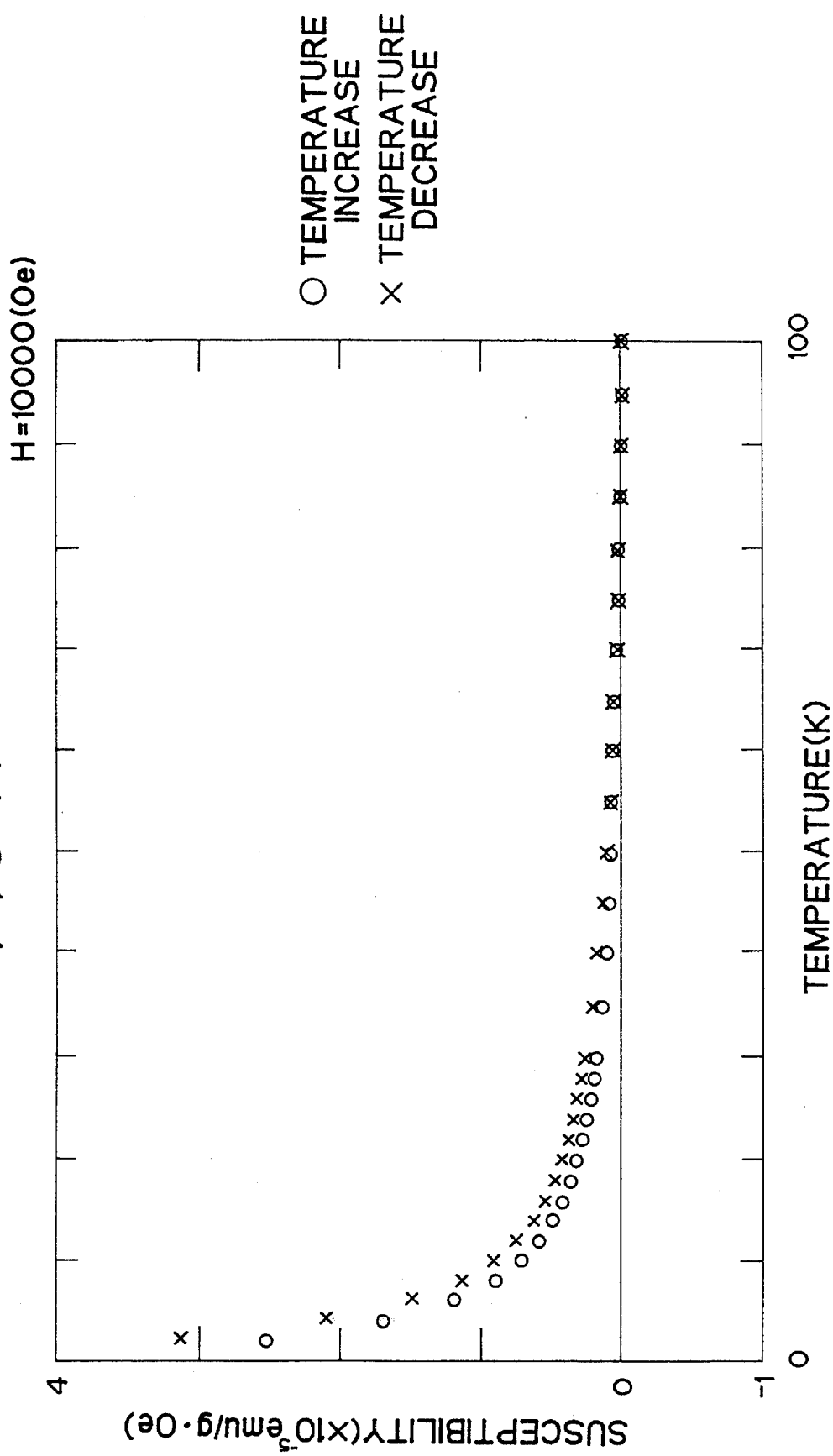

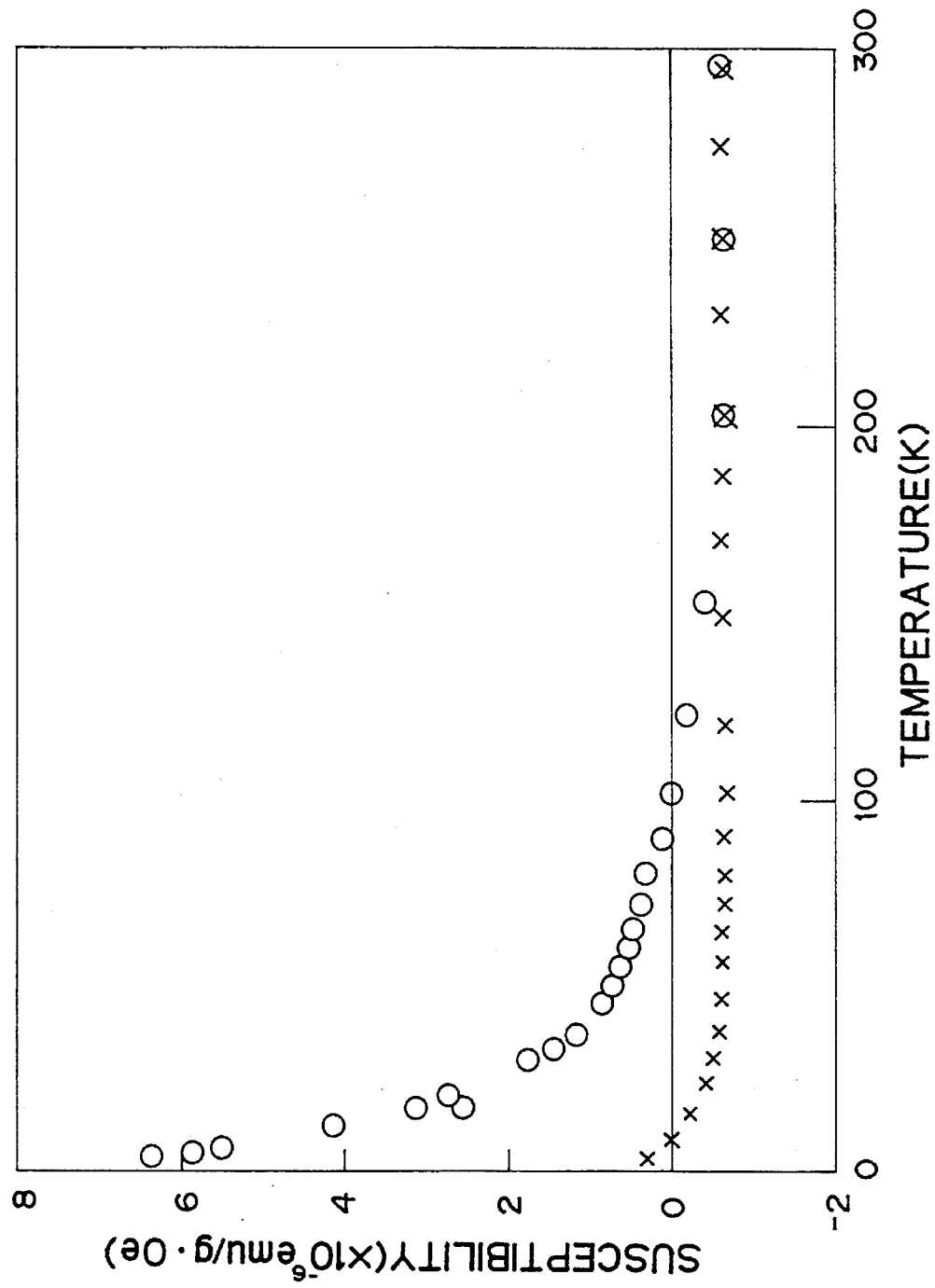

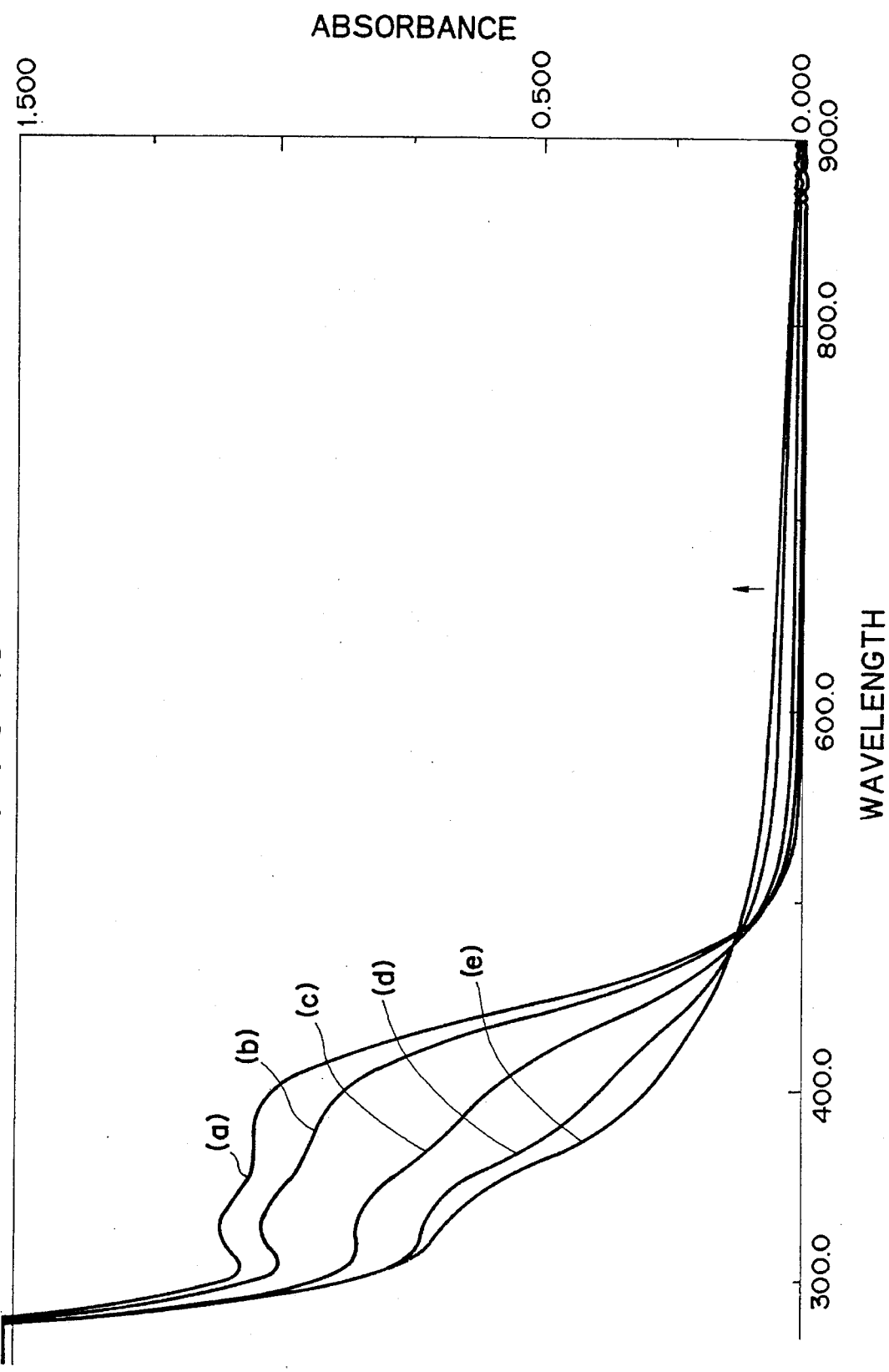

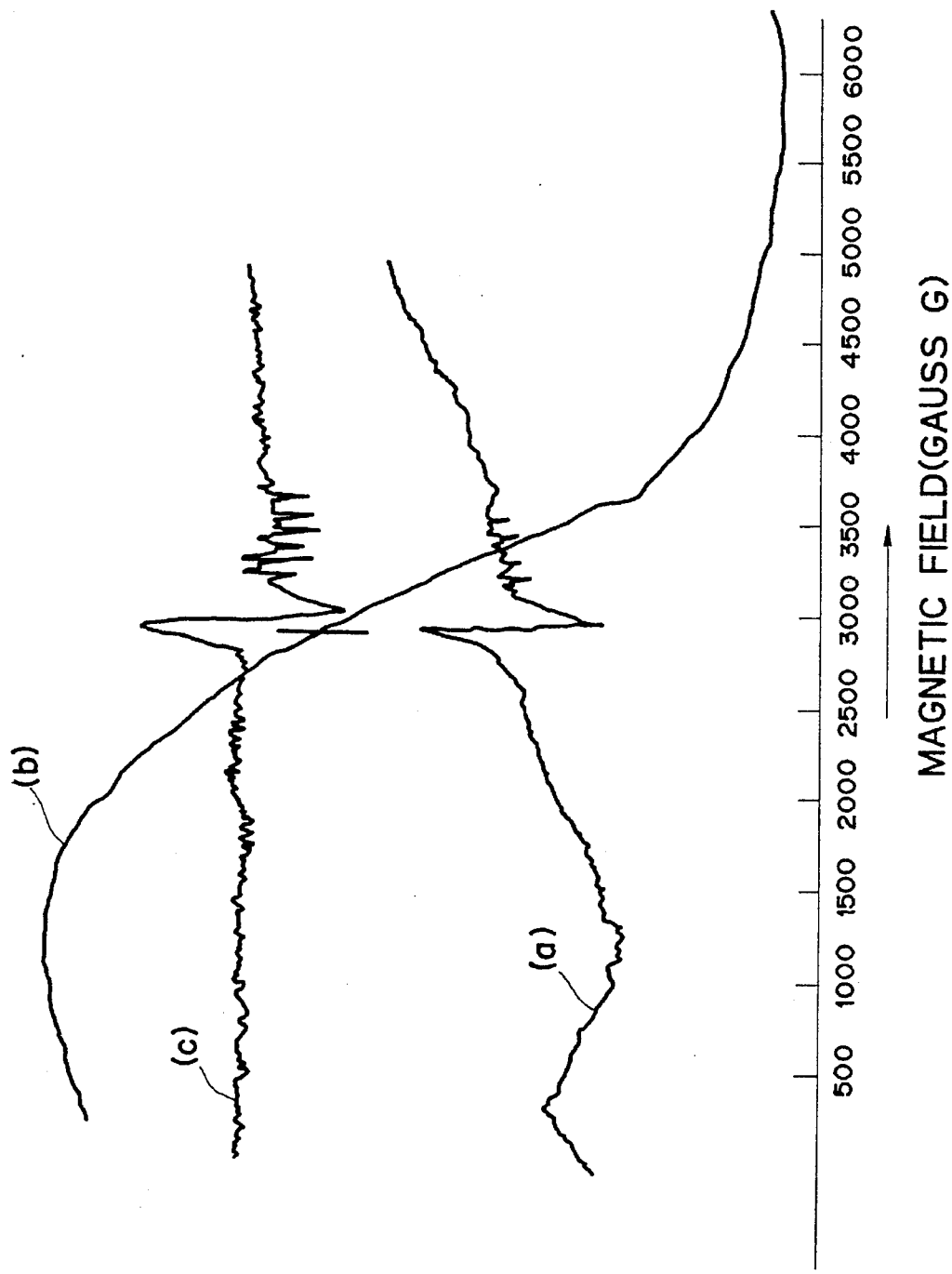

TEMPERATURE 286K
t=0

MAGNETIC FIELD (GAUSS G)

TEMPERATURE 77K
t=12 HOURS

MAGNETIC FIELD (GAUSS G)

TEMPERATURE 77K
t=15 HOURS

MAGNETIC FIELD (GAUSS G)

TEMPERATURE 77K
t=24 HOURS

MAGNETIC FIELD (GAUSS G)

ORGANIC MAGNETIC MEMBER, ORGANIC FERROMAGNETIC MEMBER, AND PROCESS FOR PRODUCING THE SAME, AND TIME-RESPONSIBLE ORGANIC FERROMAGNETIC MEMBER AND PROCESS FOR CONTROLLING DEVELOPMENT OF FERROMAGNETISM

This application is a continuation of application Ser. No. 07/764,962 filed Sep. 25, 1991, now abandoned, which is a continuation of application Ser. No. 07/590,960 filed Oct. 1, 1990, now abandoned.

BACKGROUND OF THE INVENTION

1. Field of the Invention

This invention relates to an organic ferromagnetic member having a spontaneous magnetization useful for such applications as recording media, temperature sensors, timers, magnetic shields, etc. as magnetic materials and a process for producing the same.

2. Related Background Art

So many magnetic members, that is, compounds having a ferromagnetism, are known. In compounds containing elements of the iron group and rare earth elements, that is, atoms having the d orbital and f orbital, a ferromagnetism due to the spin multiplicity is shown by degeneracy of d orbital electrons and f orbital electrons by electron spin $>\frac{1}{2}$.

On the other hand, it is not known whether organic compounds composed of carbon holding electrons only in the p orbital as the main constituent element show a ferromagnetism. However, it is a recent trend to make ferromagnetic members from organic compounds and several attempts have been already made. For example, Obchinnikov et al disclosed that diacetylene polymers combined with a nitroso compound showed a ferromagnetism [Nature, 326, 370 (1987)]. It was disclosed also in Int. Conf. on Science and Technology of Synthetic Metals, June, 1988, Santa Fe, N. Mex.) that ferromagnetic polymers were formed by thermal decomposition of polyacrylonitrile.

Furthermore, Ohtani et al disclosed that ferromagnetic organic materials were obtained by photo-irradiation of condensation products of pyrenearomatic aldehyde (COPNA resin) together with a photosensitizer such as benzoquinone, etc. [Chemical Society of Japan, No. 57 Annual Meeting in Autumn, 3D410–3D413 (1988)].

However, these organic ferromagnetic members have such problems as poor reproducibility of their magnetization characteristics and complexity in their synthesis or treatments for the development of ferromagnetism.

SUMMARY OF THE INVENTION

An object of the present invention is to provide an organic magnetic member capable of developing a ferromagnetism without conducting complicated synthesis or treatment.

Another object of the present invention is to provide a novel organic ferromagnetic member that eliminate the necessity of complicated synthesis or treatment for developing a ferromagnetism.

Another object of the present invention is to provide a time-determinative organic ferromagnetic member capable of controlling development of ferromagnetism with time.

A further object of the present invention is to provide a process for producing an organic ferromagnetic member, which can produce an organic compound having a ferromagnetism without conducting any complicated synthesis or treatment.

Still a further object of the present invention is to provide a process for controlling development of ferromagnetism of time-determinative organic ferromagnetic member, which can control the development of ferromagnetism with time.

The present organic magnetic member comprises repetition units represented by the following general formula [I]:

wherein at least one of $R_1$ and $R_2$ is a substituted or unsubstituted aryl group or a substituted or unsubstituted heterocyclic group, and is spontaneously magnetized.

Furthermore, the present organic magnetic member comprises repetition units represented by the following general formula:

wherein at least one of $R_1$ and $R_2$ is a substituted or unsubstituted aromatic ring or a substituted or unsubstituted heterocyclic ring, and is convertible to an organic ferromagnetic member having a ferromagnetism by bringing the member to a temperature $T_1$ and then retaining the member in a range of the temperature $T_1$ and a temperature $T_2$ for a given time.

Furthermore, the present organic ferromagnetic member comprises repetition units represented by the following general formula [I]:

wherein at least one of $R_1$ and $R_2$ is a substituted or unsubstituted aromatic ring or a substituted or unsubstituted heterocyclic ring and has a ferromagnetism.

Furthermore, the present organic ferromagnetic member comprises an organic compound having repetition units represented by the following general formula [I]:

wherein at least one of $R_1$ and $R_2$ is a substituted or unsubstituted aromatic ring or a substituted or unsubstituted heterocyclic ring, the organic compound being brought to a temperature $T_1$ and then retained in a range between the temperature $T_1$ and a temperature T2, for a given time, wherein $T_1 \leq T_2 \leq T_c$, where $T_c$ is the Curie temperature of the organic ferromagnetic member.

Furthermore, the present process for producing an organic ferromagnetic member comprises bringing an organic compound having repetition units represented by the following general formula [I]:

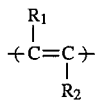

[I]

wherein at least one of $R_1$ and $R_2$ is a substituted or unsubstituted aromatic ring or a substituted or unsubstituted heterocyclic ring to a temperature $T_1$, and then retaining the compound in a range between the temperature $T_1$ and a temperature $T_2$ for a given time, wherein $T_1 \leq T_2 \leq T_c$ where $T_c$ is the Curie temperature of the organic ferromagnetic member.

Furthermore, the present time-determinative organic ferromagnetic member comprises an organic compound having repetition units represented by the following general formula [I]:

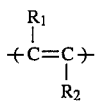

[I]

wherein at least one of $R_1$ and $R_2$ is a substituted or unsubstituted aromatic ring or a substituted or unsubstituted heterocyclic ring, and the organic compound being brought to a temperature $T_1$ and then retained in a range between the temperature $T_1$ and a temperature $T_2$ for a given time, thereby developing a ferromagnetism, wherein $T_1 \leq T_2 \leq T_c$, where $T_c$ is the Curie temperature of the organic ferromagnetic member.

Furthermore, the present process for controlling development of ferromagnetism of a time-determinative ferromagnetic member comprises a step of bringing an organic compound having repetition units represented by the following general formula [I]:

[I]

wherein at least one of $R_1$ and $R_2$ is a substituted or unsubstituted aromatic ring or a substituted or unsubstituted heterocyclic ring, to a temperature $T_1$, and then retaining the compound in a range of the temperature $T_1$ and a temperature T2, thereby developing a ferromagnetism on the organic compound after time $t_1$, where the organic compound is subjected to at least one treatment selected from a heat treatment, an electrolytic treatment, a solvent treatment, an electric discharge treatment, a light irradiation treatment and a stretching treatment, thereby developing the ferromagnetism after time $t_2$, where $T_1 \leq T_2 \leq T_c$, where $T_c$ is the Curie temperature of the organic ferromagnetic member and $t_1 \leq t_2$.

On the other hand, polyacetylene has been regarded as a peculiar polymer having conjugated double bonds and its applications to many fields such as polymer battery, etc., utilizing its electroconductivity, photoconductivity, and oxidation-reduction property, have been so far studied. Furthermore, synthesis of polyacetylene having aromatic rings as the side chains has been also studied. For example, poly(phenylacetylene) derivatives having p-methoxy groups, p-methyl groups, p-chloro groups, etc. were proposed [K. Hasegawa et al: Macromolecules, 8, 255–259, 1975; Japanese Patent Applications Kokai (Laid-Open) Nos. 63-275613 and 63-275614], and poly(phenylacetylene) derivatives having substituents such as phenylthiophenyl groups, etc. were proposed [Japanese Patent Application Kokai (Laid-Open) No. 60-63212]. It was disclosed therein that these poly(phenylacetylene) derivatives were useful as electroconductive polymers. However, these prior art references fail to disclose that polyphenylacetylene derivatives show a ferromagnetism.

BRIEF DESCRIPTION OF THE DRAWINGS

FIG. 3 is a diagram showing susceptibility-temperature curves of Poly(4-methoxyphenylacetylene) obtained in Synthesis Example 1. The temperature conditions are 2 K to 100 K and 100 K to 2 K.

FIG. 4 is a diagram showing a magnetization curve of poly(4-methoxyphenylacetylene) obtained in Synthesis Example 1.

FIG. 5 is a diagram showing susceptibility-temperature curves of Poly(4-methoxyphenylacetylene) retained at 77 K for 48 hours. The temperature conditions are 2 K to 300 K.

FIG. 8 is a diagram showing a magnetization curve of poly(4-chlorophenylacetylene). The temperature condition is 5 K.

FIG. 9 is a diagram showing a magnetization curve of poly(4-chlorophenylacetylene) subjected to a second heat treatment. The temperature condition is 5 K.

FIG. 10 is a diagram showing a magnetization curve of Poly(4-chlorophenylacetylene) subjected to a heat treatment without any application of a magnetic field. The temperature condition is 5 K.

FIG. 11 is a diagram showing susceptibility-temperature curves of Poly(4-chlorophenylacetylene) of Example 2-2. The temperature conditions are 2 K to 100 K and 100 K to 2 K.

FIG. 12 is a diagram showing susceptibility-temperature curves of poly(4-chlorophenylacetylene) retained at 77 K for 48 hours. The temperature conditions are 2 K to 300 K.

FIG. 13 is a diagram showing changes in the visible spectrum during the electrolytic treatment of polyphenylacetylene.

FIG. 14 is an ESR spectrum diagram of polyphenylacetylene before and after the electrolytic treatment. The temperature conditions are room temperature for 14(a) and 14(c) and 77 K for 14(b).

DETAILED DESCRIPTION OF THE PREFERRED EMBODIMENTS

Figure 1:
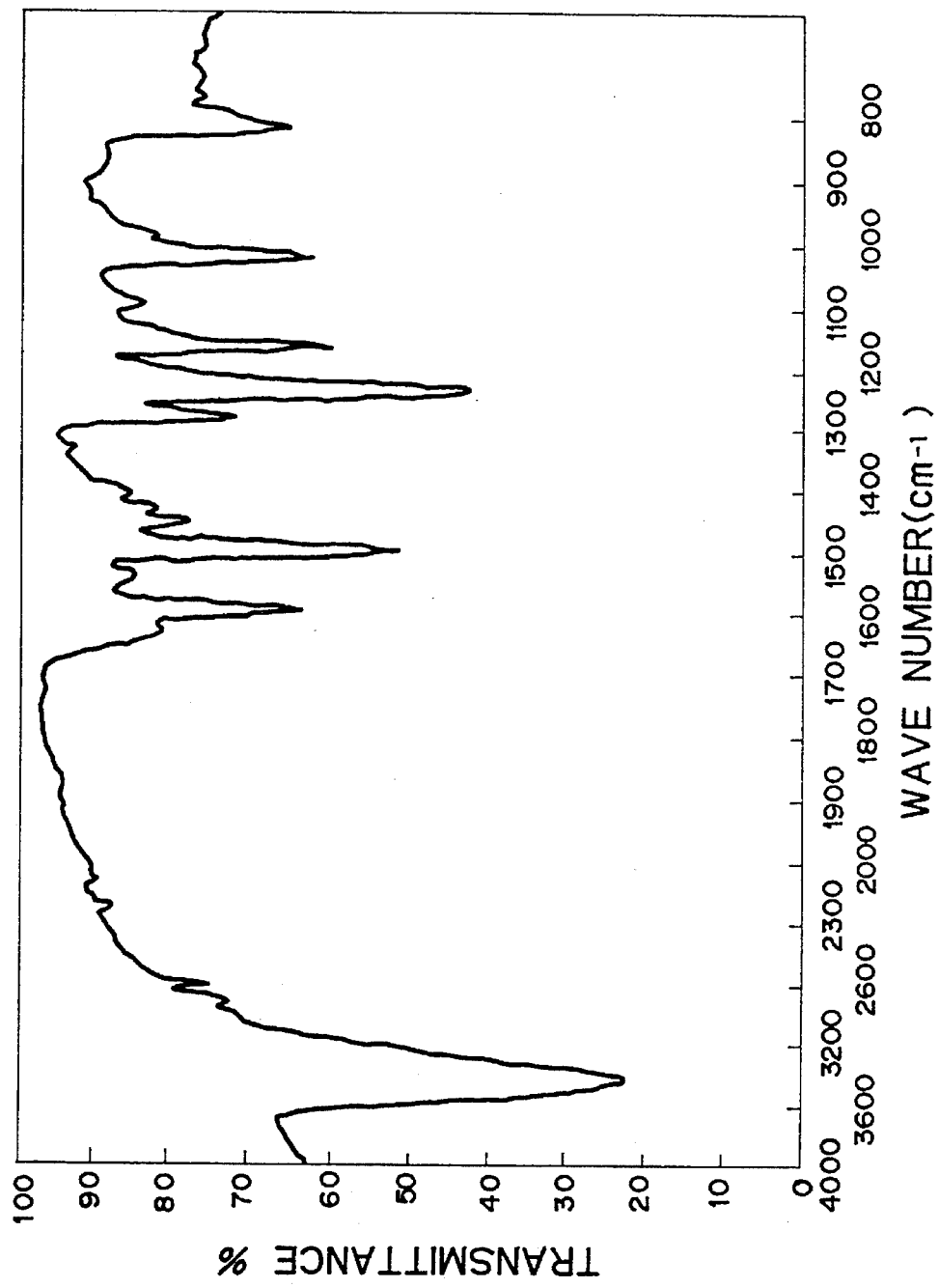
FIGS. 1 and 2 are IR spectrum charts of compounds obtained in Synthesis Examples 1 and 2, respectively.

The present invention will be described in detail below.

The present organic magnetic member has repetition units represented by the following general formula [I] and is spontaneously magnetized:

[I]

wherein monovalent groups represented by $R_1$ and $R_2$ are, for example, hydrogen atom, halogen atoms, alkyl, cycloalkyl, aryl, heterocyclic groups, aromatic heterocyclic groups, amino, alkylamino, dialkylamino, amido, mercapto, alkylthio, arylthio, alkoxy, aryloxy, acyl, trialkylsilyl, nitro, cyano, sulfo, etc. These groups may have a substituent. It is preferable that at least one of $R_1$ and $R_2$ is a substituted or unsubstituted aryl group or a substituted or unsubstituted heterocyclic group. More preferable substituent $R_1$ is a hydrogen atom, alkyl or cycloalkyl and more preferable substituent $R_2$ is represented by the following general formula [II]:

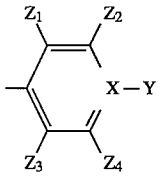
[II]

wherein X is a carbon atom or a nitrogen atom, and has a substituent Y when X is a carbon atom and has no substituent Y when X is a nitrogen atom; the substituent Y is an electron acceptor group or an electron donor group; and $Z_1$ to $Z_4$ are hydrogen atoms, electron acceptor groups or electron donor groups.

Examples of the electron donor groups in Y and $Z_1$ to $Z_4$ include alkoxy, aryloxy, alkyl, cycloalkyl, aralkyl, aryl, amino, alkylamino, dialkylamino, 1-piperidino, 1-piperazino, 1-pyrrolidino, acylamino, halogen atoms, hydroxy, mercapto, alkylthio, arylthio, trialkylsilyl, trialkylsiloxy, etc.

Examples of the electron acceptor groups include nitro, cyano, acryl, acryloxy, carboxamido, alkoxysulfonyl, phenylsulfonyl, etc.

The substituent Y is preferably alkoxy, halogen atoms, and nitro as electron acceptor groups.

The substituents $Z_1$ to $Z_4$ are preferably hydrogen atom and alkyl.

In the ESR spectrum of the present polyacetylene derivatives, a peak showing a paramagnetism is observable. Thus, the present polyacetylene derivatives include polymers having repetition units of the following general formula [III] or [IV]:

[III]

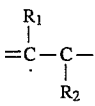
[IV]

Furthermore, the present polyacetylene derivatives include polymers whose $R_2$ is aryl or aromatic heterocyclic group and which have repetition units represented by the following general formula [V] or [VI]:

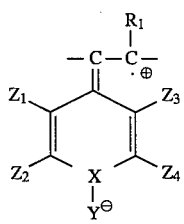
[V]

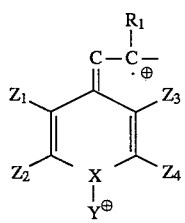
[VI]

As the present organic magnetic member, for example, polymers of acetylene-derived monomers are appropriately used. Particularly to develop a ferromagnetism, it is preferable to use monomers represented by the following general formula [VII]:

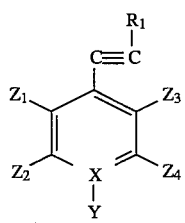
[VII]

wherein $R_1$, $Z_1$ to $Z_4$, X and Y have the same meanings as defined before.

Specific examples of the monomers include p-methoxyphenylacetylene, p-chlorophenylacetylene, 2,4,6trimethoxyphenylacetylene, 2,4,6-trichlorophenylacetylene, 4-methyl-2,6-dimethoxyphenylacetylene, 4-dimethylaminophenylacetylene, p-nitrophenylacetylene, p-cyanophenylacetylene, 2,4,6-tricyanophenylacetylene, 4-acetylenylpyridine, 4-acetylenyl-3,5-dimethylpyridine, 1-methyl-2-p-fluorophenylacetylene, 4-nitro-2-methylphenylacetylene, 2,6dimethyl-4-nitrophenylacetylene, 2,6-dimethoxy-4-nitrophenylacetylene, 4-methoxy-2-nitrophenylacetylene, phenylacetylene, o-methylphenylacetylene, o-trifluoromethylphenylacetylene, t-butylacetylene, n-butylacetylene, 1-chloro-2-n-butylacetylene, 1-chloro-1-octylacetylene, trimethylsilylacetylene, trimethylsilylpropylene, 3,5-dimethyl-4-methoxyphenylacetylene, 3,5-di-t-butyl-4-methoxyphenylacetylene, 3,5-dimethyl-4-hydroxyphenylacetylene, 3,5-di-t-butyl-4-hydroxyphenylacetylene, etc.

Examples of preferable monomers include p-chlorophenylacetylene, p-methoxyphenylacetylene, 2,4,6-trimethoxyphenylacetylene, 2,4,6-trichlorophenylacetylene, 4-methyl-2,6-dimethoxyphenylacetylene, 4-dimethylaminophenylacetylene, p-nitrophenylacetylene, p-cyanophenylacetylene, 2,4,6tricyanophenylacetylene, 4-acetynylpyridine, 1-methyl-2-p-fluorophenylacetylene, 4-nitro-2-methylphenylacetylene, 2,6-dimethyl-4-nitrophenylacetylene, 2,6-dimethyl-4-nitrophenylacetylene, 2,6-dimethoxy-4-nitrophenylacetylene, 4-methoxy-2-nitrophenylacetylene, etc. It is possible to copolymerize at least two kinds of these monomers.

Polymerization of these monomers can be carried out in the presence of a transition metal complex represented by the following general formula [VIII]:

$$[ML_lH_n]_qQ_p \quad \text{[VIII]}$$

wherein L is a ligand derived from a compound having a multiple bond: H is a ligand derived from a compound having a lone electron pair; Q is an anion; M is a transition metal having d electrons; and $l=0-5$, $n=0-1$, $p=1-2$ and $q=1-2$.

Examples of L in the foregoing general formula (VIII) are olefins, acetylene, dienes, cyclodienes, carbon monoxide, etc.; examples of H include compounds having such atoms as nitrogen, phosphorus, arsenic, oxygen, sulfur, etc.; examples of Q include halogens$^{\ominus}$, $PF_6^{\ominus}$, $BF_6^{\ominus}$, $ClO_4^{\ominus}$, etc; and examples of M include transition metals having d electrons, particularly preferably metals belonging to Groups VIIA and VIII of the periodic table.

Specific examples of L are allyl, butadienyl, cyclooctadienyl, carbon monoxide, phenylacetylenyl, etc. and particularly preferable is cyclooctadienyl.

Specific examples of H are pyridine, bipyridyl, ethylenediamine, triethylenediamine, diphenyl ether, diphenyl thioether, diethyl ether, triphenylphosphine, trioctylphosphine, triphenylarsine, phenanthroline, etc.

Specific examples of Q are $PF_6^-$, $Cl^-$, etc., and specific examples of M are rhodium, ruthenium, rhenium, nickel, platinum, etc.

Specific examples of the catalysts represented by the general formula (VIII) are as follows:

[Rh(COD)bipy]PF$_6$, [Rh(COD)bipyam]PF$_6$,
[Rh(COD)(pph$_3$)$_2$]PF$_6$, [Rh(NBD)bipy]PF$_6$,
[Rh(COD)EDA]Cl, [Rh(COD)TEDA]Cl, [Rh(COD)Cl]$_2$,
Re(CO)$_3$X, [Re(CO$_3$Cl]$_2$, Rh$_2$(COD)$_2$Cl$_2$, Re(CO)$_6$(PPh$_3$)Cl,
Re(CO)$_6$(bipy)Cl, Re(CO)$_3$(PPh$_3$)$_2$Cl, [Re(CO)$_4$Cl]$_2$,
Re(CO)$_3$(Ph$_2$PCH$_2$CH$_2$PPh$_2$)Cl, Ni(CO)$_2$(PPh$_3$)$_2$,
Rh(PPh$_3$)$_2$Cl, Ni(PPh$_3$)$_2$X$_2$, Pt(PPh$_3$)$_3$(C≡CPh)$_2$,
Pt(PPh$_3$)$_3$HCl, and Pt(PPh$_3$)$_3$Cl$_2$ wherein:
COD: cyclooctadienyl
NBD: norbonadienyl
EDA: ethylenediamine
TEDA: triethylenediamine
bipy: bipyridyl
bipyam: bipyran
Ph: phenyl
X: halogen As the catalyst, the following compounds (A) to (D) can be used besides the above-mentioned compounds.

(A) Halides of Group VIA metals of the periodic table (B) Combinations of halides of Group VIA metals of the periodic table with organometallic compounds (C) Mo(CO)$_6$—CCl$_4$hv or W(CO)$_6$—CCl$_4$ hv (D) Oxyhalides of Group VIA metals of the periodic table alone or combinations of the oxyhalides with organometallic compounds and/or Lewis bases, or combinations of halides of Group VIA metals of the periodic table with organometallic compounds and Lewis bases.

The catalyst for use in the synthesis of polyacetylene derivatives is not limited to the above-mentioned catalysts.

The amount of the catalyst is usualy about $1\times10^{-5}$ to $1\times10^{-1}$ mole %.

The polymerization can be carried out in the presence of an inert solvent, for example, alcohols such as methanol, ethanol, etc.; ethers such as diethyl ether, tetrahydrofuran, dioxane, anisol, etc.; aromatic hydrocarbons; aliphatic amines; and a mixture of these solvents. The reaction temperature is usually $-30°$ to $120°$ C., preferably about $0°$ to about $100°$ C., and the polymerization reaction is usually completed in one minute to 64 hours.

Polyacetylene derivatives thus synthesized and applicable as the present organic magnetic members are characterized by being spontaneously magnetized. In the present invention, the term "spontaneous magnetization" means bringing a compound into a ferromagnetism-developable state by subjecting the compound to a heat treatment of retaining the compound at a temperature not more than the Curie temperature for a given time. When the polyacetylene derivative obtained by the polymerization develops a ferromagnetism by the heat treatment, the the polyacetylene derivative is deemed to be spontaneously magnetized.

The present process for producing an organic, ferromagnetic member will be described below.

The present organic ferromagnetic member can be obtained by bringing an organic magnetic member having repetition units represented by the above-mentioned general formula [I], where at least one of $R_1$ and $R_2$ is a substituted or unsubstituted aromatic ring or a substituted or unsubstituted heterocyclic ring and being spontaneously magnetized to a temperature $T_1$, and then to a range between the temperature $T_1$ and a temperature $T_2$ for a given time, where $T_1 \leq T_2$ and both $T_1$ and $T_2$ are not more than the Curie temperature ($T_c$) of the present organic ferromagnetic member. That is, the organic magnetic member which is spontaneously magnetized is a precursor of the present organic ferromagnetic member.

Temperature $T_2$ for the heat treatment depends upon the species of substituted or unsubstituted aromatic ring or heterocyclic ring bonded to the main chain carbon of the polyacetylene derivative and also upon the hysteresis of substituents bonded to the ring or the compound, and is preferably not more than 115 K, more preferably not more than 110 K, and most preferably not more than 100 K. The retention time in a range between the temperatures $T_1$ and $T_2$ is preferably 5 minutes or more, more preferably 20 minutes or more, most preferably one hour or more.

When the present polyacetylene derivatives are subjected to an oxidation-reduction treatment, a treatment with good solvent, or a mechanical stretching, the time of heat treatment of retaining in a range between the temperatures $T_1$ and $T_2$, which is necessary for the development of a ferromagnetism, can be shortened, and the heat treatment temperature for the development of a ferromagnetism can be increased, and also the susceptibility can be increased. The oxidation-reduction treatment refers to all the treatments involving donating and acceptance of electrons. Examples of the oxidation-reduction treatment include heating, photoirradiation, electrolytic oxidation or reduction, electric discharge, etc. Specific examples of the oxidation-reduction treatment include a method for heat treating a polyacetylene derivative at a temperature of about 50° to about 200° C.; a method for oxidizing a polyacetylene derivative by hetero reaction using a halogen such as $I_2$, etc. or a halide, an oxide such as $PbO_2$, etc., or a metal such as Na, etc.; a releasing reaction using a peroxide or an azo compound; a method for using a reaction system capable of producing a structure defect such as cleavage of chemical bonds when a polyacetylene derivative is to be produced; oxidation-reduction reaction on the electrode surface of a metal, etc.; irradiation with radioactive ray, electromagnetic wave, etc.; photoirradiation with an actinic ray such as ultraviolet ray, etc.; and a method using silent electric discharge with a DC current or low frequency, glow-discharge, high frequency discharge, microwave and discharge.

The above-mentioned effects, such as shortening of the heat treatment time for the development of a ferromagnetism, etc. can be obtained also by treating the polyacetylene derivative with a good solvent. The solvent for use in the treatment may be a good solvent for the polyacetylene derivative, and specific examples of the good solvents include aromatic solvents and halogen-containing solvents such as benzene, toluene, xylene, chloroform, etc.

The reasons why such effects as shortening of the heat treatment time, increase in the magnetic moment, etc. by these treatments are not clarified yet, but it seems that so many magnetic electrons taking part in the development of a ferromagnetism are formed by these treatments.

In the case of solvent treatment, the polyacetylene derivative is crystallized, and thus it seems that these effects are due to a change in the crystal structure and orientation of polymers. The foregoing treatments are preferably carried out in an inert gas atmosphere or under degassing.

The above-mentioned oxidation-reduction treatments, treatment with a good solvent and a stretching treatment can be carried out alone or in combination of at least two thereof. The treatment time can be selected as desired, in view of the treating method and conditions.

These treatments can be carried out before or after the heat treatment of polyacetylene compound for the development of a ferromagnetism, and the photoirradiation, electromagnetic wave irradiation, radio-active ray irradiation, and electric discharge can be carried out during the heat treatment.

Furthermore, the time required for the development of a ferromagnetism on the organic magnetic member can be changed by controlling the degree of these treatments of the organic magnetic member. That is, the present organic ferromagnetic member has a specific time period for developing the ferromagnetism.

It is preferable that the present organic ferromagnetic member having a ferromagnetism has an absorbance at a lower magnetic field side in the electron spin resonance (ESR) spectrum than the absorbance due to the paramagnetic radical shown by the organic magnetic member at the ordinary temperature.

The spin density of the present organic ferromagnetic member is preferably not less than $10^{16}$ spins/g. Furthermore, a higher saturation magnetization and a higher saturation magnetic flux density are desirable, and thus the spin density is more preferably not less than $10^{17}$ spins/g.

As described above, a ferromagnetism can be developed on a polyacetylene derivative as an organic compound according to the present invention, and also an organic ferromagnetic member can be obtained without any complicated synthesis or treatment. Furthermore, a time-determinative organic ferromagnetic member capable of controlling the development of a ferromagnetism with time can be obtained according to the present invention.

The present organic ferromagnetic member is useful for applications to such fields as recording media, magnetic shields, or timers utilizing the time response or temperature sensors, etc.

The present invention will be described in detail below, referring to Examples.

Synthesis Example 1

A 50-ml flat bottom flask was flushed with $N_2$, and ethanol was placed therein and 1.32 g (0.01 moles) of 4-methoxyphenylacetylene was added thereto. After stirring, 1/300 mole of cyclooctadienylrhodium chloride was added thereto on the basis of the monomer, and the monomer was subjected to reaction at 40° C. for 24 hours. The formed polymer was precipitated in the ethanol, recovered therefrom by filtration and washed with ethanol, whereby poly(4-methoxyphenylacetylene) having a weight average molecular weight of 100,000 to 260,000 was obtained.

IR spectrum of the thus synthesized poly (4 methoxyphenylacetylene) is shown in FIG. 1. Measurement of the molecular weight was made by gel permeation chromatography (HLC-8020, trade name of Toso K.K., Japan), and tetrahydrofuran was used as the solvent.

Synthesis Example 2

Figure 2:
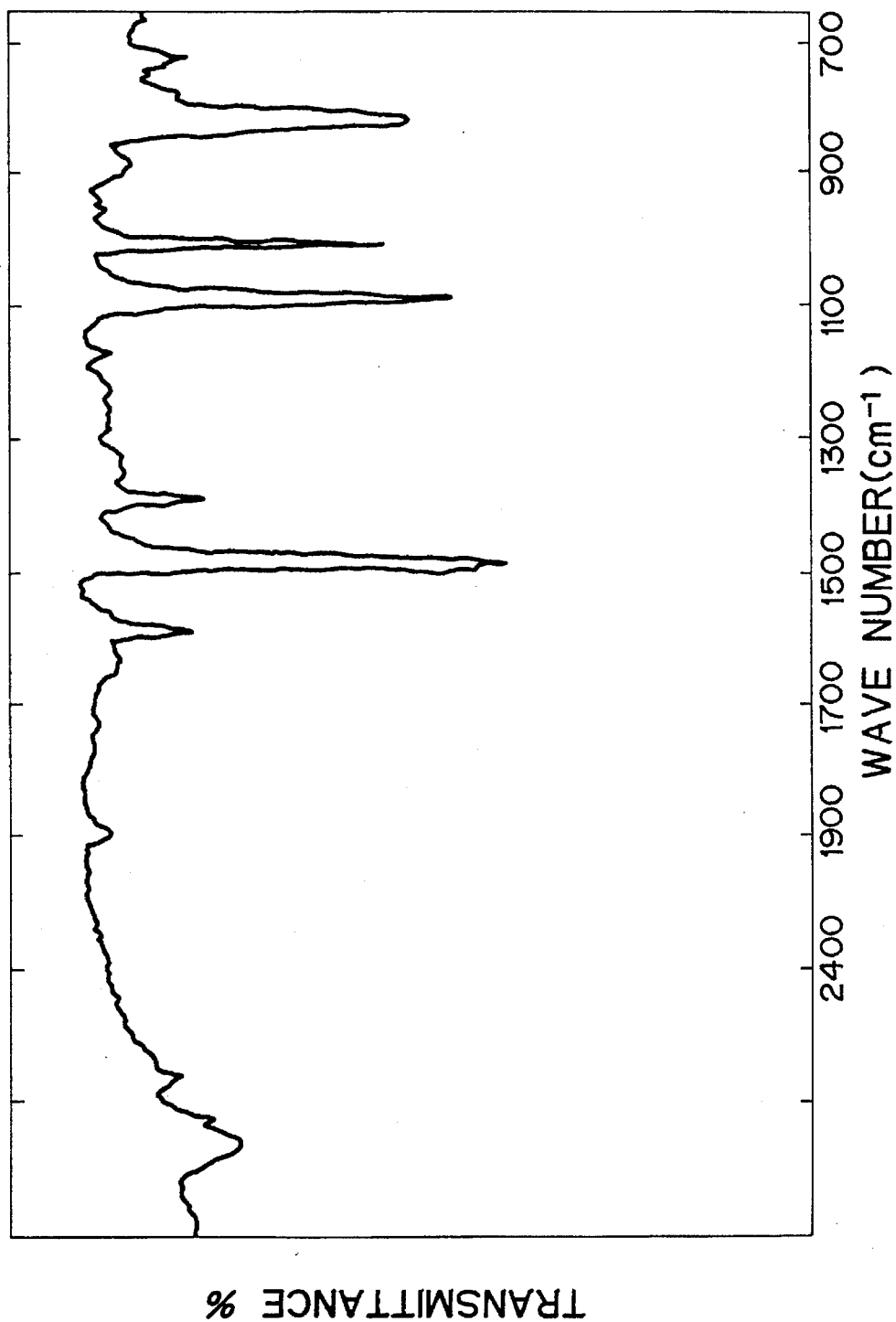

Reaction was carried out in the same manner as in Synthesis Example 1, except that 4-chlorophenylacetylene was used in place of 4-methoxyphenylacetylene. IR spectrum of the thus obtained poly (4-chlorophenylacetylene) is shown in FIG. 2.

Example 1-1

Poly(4-methoxyphenylacetylene) synthesized in Synthesis Example 1 was subjected to heat treatment and then to measurement of magnetic characteristics.

Powders of poly(4-methoxyphenylacetylene) were filled into capsules to prepare samples. Then, the sample space of a superconductive quantum interference-type, magnetization meter, (which will be hereinafter referred to as SQUID), Model MPMS (trade name of Quantum Design Co.) was kept at 5K with liquid helium. Then, the sample was inserted into the sample space from a space at room temperature, and a magnetic field of 10,000 Oe was applied. The sample was cooled to 2K and heated to 100 K and then cooled to 2 K again.

The temperature-increasing and temperature-decreasing rates were each 5K/10 minutes. The measurement of magnetic characteristics was made while keeping the sample at that temperature. The susceptibility-temperature characteristics in the temperature-increasing and temperature-decreasing steps are shown in FIG. 3. The symbol "O" refers to an increase in temperature an "x" refers to a decrease in temperature. It is obvious from FIG. 3 that the susceptibility was increased to $1.15 \times 10^{-6}$ emu/g by cooling poly(4-methoxyphenylacetylene) to 2K, and there was a difference in the susceptibility between the temperature-increasing step and the temperature decreasing step. That is, the susceptibility was made larger after the temperature-increasing step of heating the sample once to 100K than before the temperature-increasing step.

Magnetization curve of poly(4-methoxyphenylacetylene) at 5K is shown in FIG. 4. It is obvious from FIG. 4 that after magnetic saturation under 20,000 Oe magnetization took place in the direction opposite to the applied magnetic field. From the foregoing results, it is presumable that the compound of the present Example has a ferromagnetic moiety and a diamagnetic moiety. It is also presumable that the increase in the susceptibility at a low temperature after the temperature-increasing step as shown in FIG. 3 is based not on the Curie-Weiss behavior of spin susceptibility, but on the generation of ferromagnetic moment.

No residual magnetization was observed in the measurement, because a superparamagnetic behavior prevailed owing to separate existence of ferromagnetic zones in the sample.

It is also presumable from the disappearance of a ferromagnetism at about 100K in FIG. 3 that the Curie temperature of ferromagnetic poly(4-methoxyphenylacetylene) was about 100K.

Example 1-2

Poly(4-methoxyphenylacetylene) obtained in Synthesis Example 1 was cooled to 77K from room temperature with liquid nitrogen and kept at that temperature for 48 hours.

Susceptibility-temperature characteristics of the sample were measured in the same manner as in Example 1-1 by cooling the sample to 2K and heating it to 300K. Likewise, susceptibility-temperature characteristics of a sample not kept at 77 K were measured. The results are shown in FIG. 5. The symbol "0" indicates the temperature kept at 77K and the symbol "x" indicates the temperature kept at a temperature other than 77K. It is obvious from FIG. 5 that the susceptibility of the sample not kept at 77K for 48 hours (as identified by mark "X") was increased in the low temperature region, and the susceptibility of the sample kept at 77K for 48 hours (as identified by mark "O") was increased about 10 times as large as that of the sample not kept at 77K.

Figure 6A:
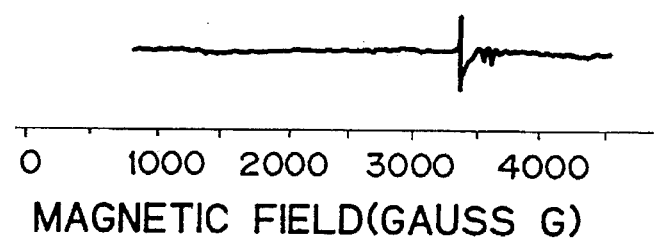
FIGS. 6A and 6B are electron spin resonance (ESR) spectrum diagrams of Poly(4-methoxyphenylacetylene) before and after the heat treatment, respectively.
Figure 6B:
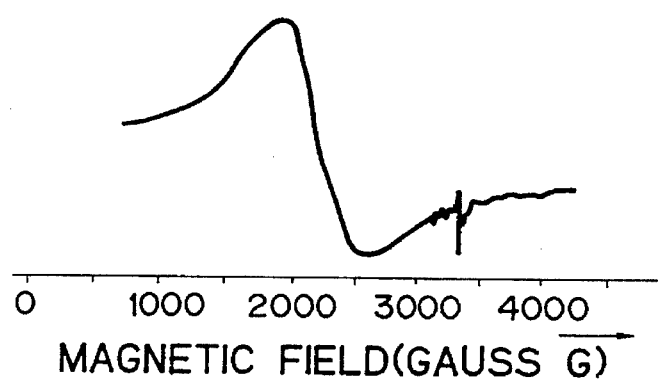

Electron resonance spectrum (ESR spectrum) of poly(4-methoxyphenylacetylene) at the ordinary temperature is shown in FIG. 6A, and that of poly(4-methoxyphenylacetylene) cooled to 77K and kept at 77K for 48 hours is shown in FIG. 6B. As shown in FIGS. 6A and 6B, a very broad absorbance due to the heat treatment appeared in a low magnetic field of 1,500 to 3,000 G in addition to the sharp absorbance at about 3,300 G due to the paramagnetic radical usually existing in the poly(4-methoxyphenylacetylene). It seems that the broad absorbance is due to the ferromagnetic interaction. The broad absorbance was developed by keeping the sample at 77K for 30 to 48 hours.

ESR spectrum of the samples was measured by an ESR spectrometer of 100 . KHz magnetic field modulation, JEOL-JES-FEIXG (trade name Nihon Denshi K. K., Japan) by thoroughly degassing the samples in a sample tube.

$\chi^0$, C and θ values were obtained by the following equation (1) according to the method of least squares and a spin density was calculated by the following equation (2) on the basis of g=2 and s=½

$$\chi = \chi^0 + C/(T-\Theta) \quad (1)$$

$$\chi = \chi^0 + C/(T-\theta) \quad (1)$$

$$C = \frac{N}{3k} S(S+1) g^2 \beta^2 \quad (2)$$

wherein $\chi$ is a susceptibility; $\chi^0$ is a diamagnetic susceptibility; C is a Curie constant; T is a temperature; N is a spin number; S is a spin quantum number; g is a g value; β is a Bohr magneton; and k is a Boltzmann constant.

The spin density calculated from the susceptibility at 77K measured by SQUID after the sample was kept at 77K for 48 hours was about $10^4$ times as large as the spin density calculated from the double integral of the absorbance due to paramagnetic radical of the sample, measured by ESR as shown in Table 1.

TABLE 1

| Spin density (spins/g) | |
|---|---|
| SQUID | ESR |
| $4.83 \times 10^{20}$ | $4.5 \times 10^{16}$ |

Example 1-3

Poly(4-methoxyphenylacetylene) was degassified, heat treated at 150° C. for 30 minutes and cooled to 77K, whereby the time for developing the ferromagnetism was shortened. That is, it was found that the susceptibility of the sample kept at 77K for about 18 hours was about 10 times as large as that of the sample not kept at 77K, as in Example 1-2.

Figure 6C:
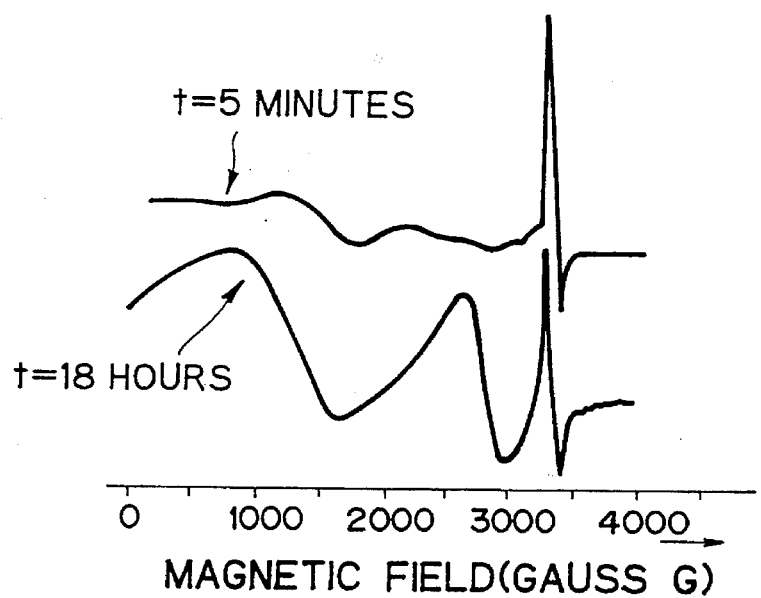
FIG. 6C is an ESR spectrum diagram of poly(4-methoxyphenylacetylene) cooled after heat treatment at 150° C.

As shown in FIG. 6C, a broad absorbance appeared in a low magnetic field region by cooling the sample to 77K and keeping it at 77K for about 5 minutes, and a very broad absorbance appeared in the low magnetic field region by keeping it at 77K for 18 hours. That is, the spin density was increased in a short time, as compared with the sample not subjected to the heat treatment.

Example 2-1

Poly(4-chlorophenylacetylene) obtained in Synthesis Example 2 was subjected to measurement of magnetic characteristics in the same manner as in Example 1-1.

Figure 7:
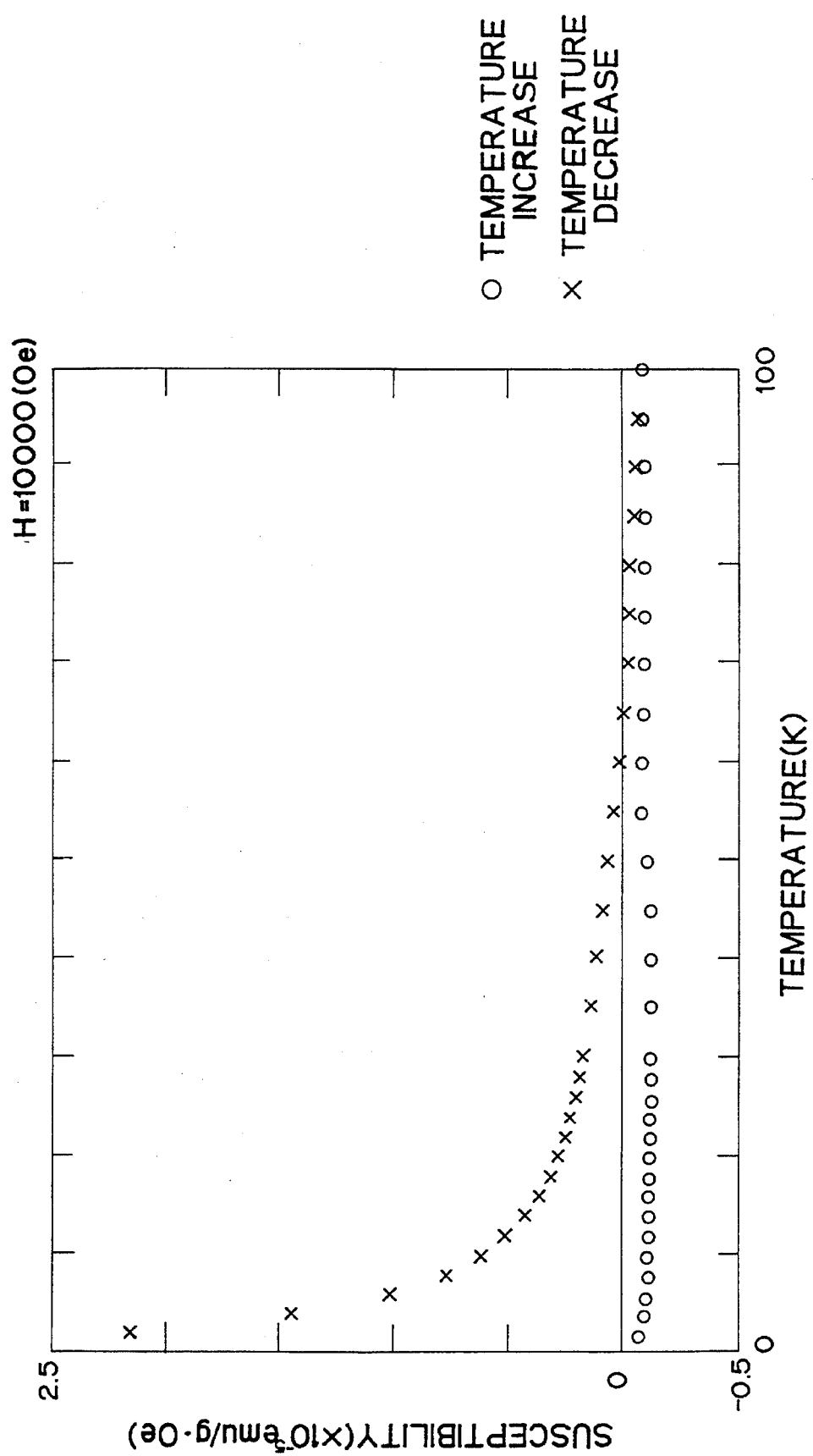
FIG. 7 is a diagram showing susceptibility-temperature curves of Poly(4-chlorophenylacetylene) obtained in Synthesis Example 2. 2 K to 100 K and 100 K to 2 K.

In FIG. 7, susceptibility-temperature characteristics are shown. The symbol "O" refers to an increase in temperature and the symbol "x" refers to a decrease in temperature. It is obvious from FIG. 7, that the susceptibility of poly(4-chlorophenylacetylene) was increased in the low temperature region and there was a very large difference in the susceptibility between the temperature-increasing step and the temperature-decreasing step.

Then, the sample was subjected to measurement of magnetization at 5K. The magnetization curve is shown in FIG. 8. It is obvious from FIG. 8 that a magnetic saturation was obtained with increasing intensity of applied magnetic field and thus it is presumable therefrom that a ferromagnetic moment was developed.

Then, the sample was subjected to a second heat treatment by changing the temperature from 2K to 100K and then to 2K, and the magnetization curve of the sample at 5K is shown in FIG. 9. It is obvious from FIG. 9 that the magnetic moment was further increased by the second heat treatment, and a magnetic saturation was also observed as in FIG. 8. The spontaneous magnetization was in the order of 1 emu/g at that time. It is presumable from the disappearance of the ferromagnetism at about 100K in FIG. 7 that the Curie temperature of poly(4-chlorophenylacetylene) was 100K or higher.

Example 2-2

Magnetic characteristics of poly(4-chlorophenylacetylene) obtained in Synthesis Example 2 as a sample were measured by the same apparatus as used in Example 1-1 in the following manner:

1) Keep the sample space at 5K.
2) Insert the sample into the sample space from a space at room temperature.
3) Heat the sample space and keep it at 100K for one hour.
4) Cool the sample space again to 5K and apply a magnetic field thereto to measure magnetic characteristics.

The results are shown in FIG. 10. It is obvious from FIG. 10 that a magnetic saturation was observed as in FIGS. 8 and 9, and a ferromagnetic moment was developed on the sample.

Then, the sample was subjected to temperature increase and temperature decrease between 2K and 100K at a rate of 5K/10 minutes to measure the susceptibility-temperature characteristics. The results are shown in FIG. 11. The symbol "O" refers to an increase in temperature and the symbol "x" refers to a decrease in temperature. As is obvious from FIG. 11, the susceptibility was larger than that of the sample merely cooled as shown in FIG. 7. It is presumable therefrom that the susceptibility can be increased by keeping the sample at a temperature below the Curie temperature for a long time.

It is also obvious from FIG. 11 that there was no substantial difference in the susceptibility between the temperature-increasing step and the temperature-decreasing step and particularly the susceptibility in the low temperature region in the temperature-increasing step has no substantial difference from the susceptibility in the temperature-decreasing step. This shows that the increase in the susceptibility in the low temperature zone in the temperature-decreasing step shown in FIG. 7 is not due to the thermal residual magnetization caused by cooling in the magnetic field.

Example 2-3

Poly(4-chlorophenylacetylene) obtained in Synthesis Example 2 was cooled to 77K from room temperature and kept at 77K for 15 hours.

Susceptibility-temperature characteristics of the sample were measured in the same manner as in Example 1-2. The results are shown in FIG. 12. The symbol "O" indicates the temperature kept at 77K and "x" indicates the temperature not kept at 77K. It is obvious from FIG. 12 that the susceptibility of the sample kept at 77K for 15 hours was about 10 times that of the sample not kept at 77K.

Spin density of the sample kept at 77K for 15 hours was measured by SQUID and ESR in the same manner as in Example 1-2. The results are shown in Table 2.

TABLE 2

| Spin density (spins/g) | |
|---|---|
| SQUID | ESR |
| $8.42 \times 10^{19}$ | $1.2 \times 10^{17}$ |

It is obvious from Table 2 that the spin density of the sample kept at 77K obtained by SQUID was 100 times as high as that obtained by double integral of paramagnetic absorbance of ESR spectrum.

Synthesis Example 3

Yellow powdery polyphenylacetylene having a weight average molecular weight of 200,000 was produced in the same manner as in Synthesis Example 1, except that phenylacetylene was used in place of 4-methoxyphenylacetylene of Synthesis Example 1.

Example 3-1

Polyphenylacetylene produced in Synthesis Example 3 was cooled to 77K from room temperature and kept at 77K for 24 hours.

Susceptibility-temperature characteristics of the sample were measured in the same manner as in Example $_2$-3, and it was found that the susceptibility was about 10 times as large as that of the sample not kept at 77K, as in Example 2-3.

Example 3-2

15.5 millimoles of polyphenylacetylene obtained in Synthesis Example 3° was subjected to an electrolytic treatment in an electrolytic solution containing 0.1M $Bu_4NClO_4$/ $CH_2Cl_2$ at a voltage of 1.2 V for 6 hours.

Changes in the visible spectrum of polyphenylacetylene depending on the electrolytic treatment time are shown in FIG. 13, where curve (a) is directed to zero time; curve (b) to the time of 5 minutes, curve (c) to the time of 30 minutes, curve (d) to the time of 60 minutes and curve (e) to the time of 90 minutes.

Susceptibility-temperature characteristics of electrolytically treated polyphenylacetylene were measured in the same manner as in Example 1-2 without keeping it at 77K, and it was found that the susceptibility was increased to substantial equal degree to that of the susceptibility observed in Example 3-1, and the time for the heat treatment for the development of a ferromagnetism could be shortened.

In FIG. 14, ESR spectrum of electrolytically treated polyphenylacetylene at room temperature is shown as curve (a), and ESR spectrum of electrolytically treated polyphenylacetylene, cooled to 77K, is shown as curve (b). Furthermore, ESR spectrum of polyphenylacetylene at room temperature, not subjected to the electrolytic treatment is shown as curve (c).

It is obvious from FIG. 14 that an ordinary signal due to the paramagnetic radical appeared at g=2.0028 on the electrolytically treated polyphenylacetylene at room temperature, and a signal of line width $\Delta$ Hmsl $\cong$ 86G appeared at about 2870 G on the low magnetic field side on the electrolytically treated polyphenylacetylene at room temperature. When the electrolytically treated polyphenylacetylene was cooled to 77K, a very broad signal appeared in the low magnetic field region.

Example 3-3

Figure 15A:
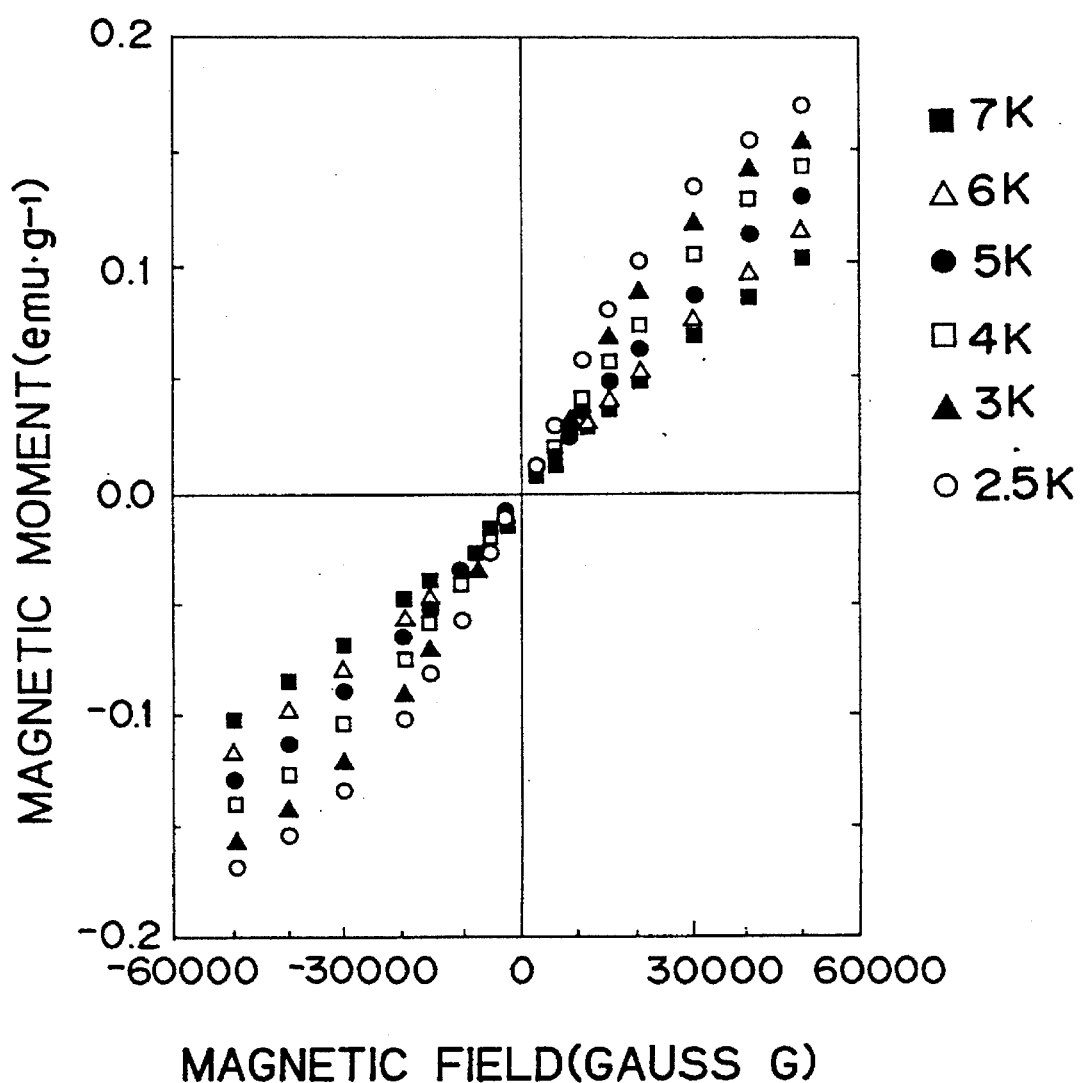
FIGS. 15A and 15B are diagrams showing relations between the magnetic field and the magnetic moment before and after the toluene treatment of Example 3-3 respectively. The temperature conditions are room temperature to 2.5 K to 77 K.
Figure 15B:
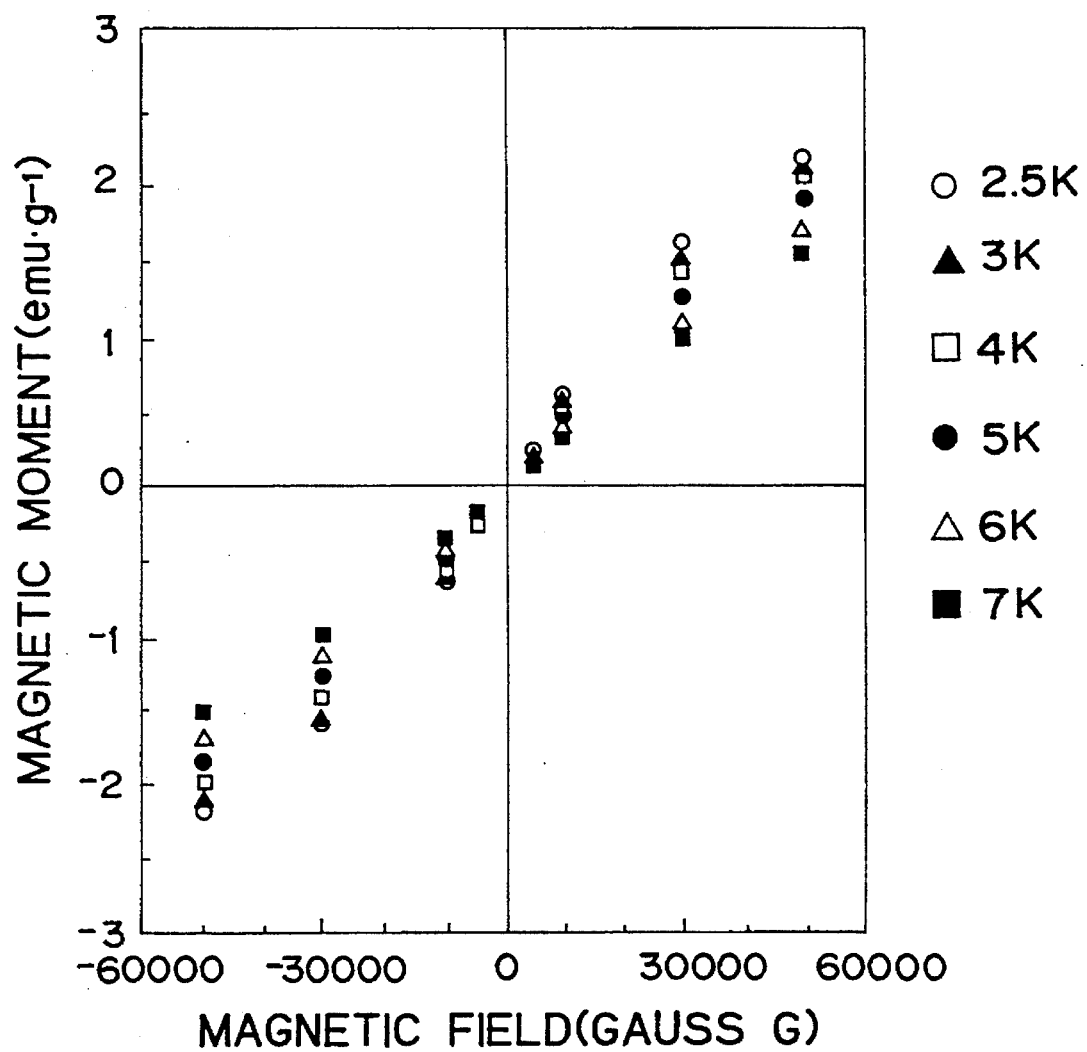

Polyphenylacetylene obtained in Synthesis Example 3 was treated with toluene, whereby it was changed to crystalline polymer having a crystallization degree of 60 to 75 % as a red rubbery material. Magnetic momentmagnetic field characteristics of polyphenylacetylene cooled to a temperature of 2.5 to 7K from room temperature before the toluene treatment are shown in FIG. 15A, and those of polyphenylacetylene likewise cooled to a temperature of 2.5 to 7K from room temperature after the toluene treatment are shown in FIG. 15B. It is obvious from FIGS. 15A and 15B that the magnetic moment was made about 10 times as large by treating polyphenylacetylene with toluene. That is, the time required for the development of a ferromagnetism could be shortened by treating polyphenylacetylene with toluene.

Figure 16A:
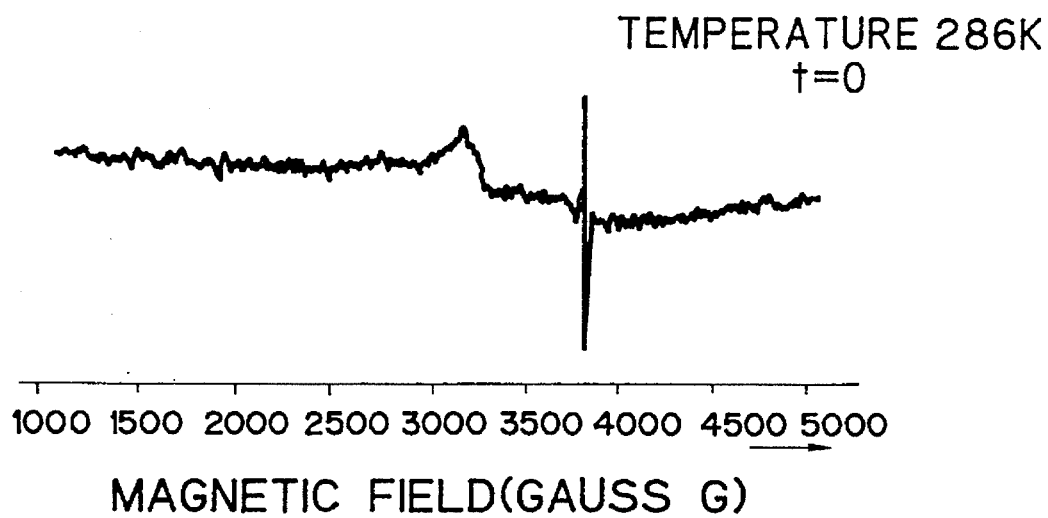
FIGS. 16A, 16B, 16C and 16D are diagrams showing changes in the ESR spectrum of polyphenylacetylene subjected to the toluene treatment at 77 K with lapse of time, respectively. The temperature conditions are 286 K for 16(A) and 77 K for 16(B) and 16(D).
Figure 16B:
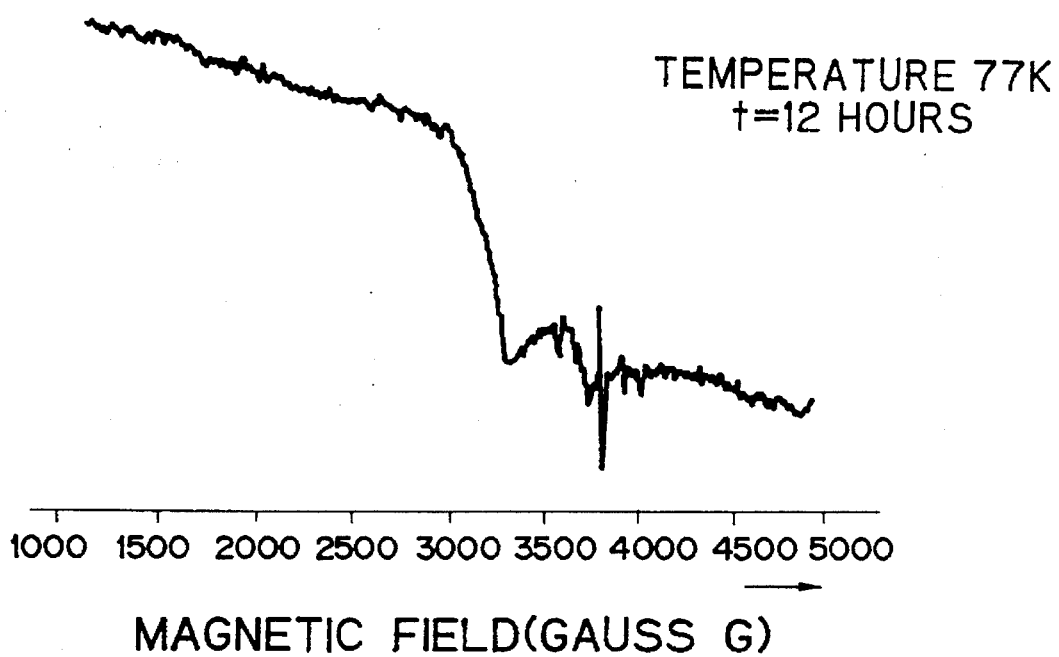
Figure 16C:
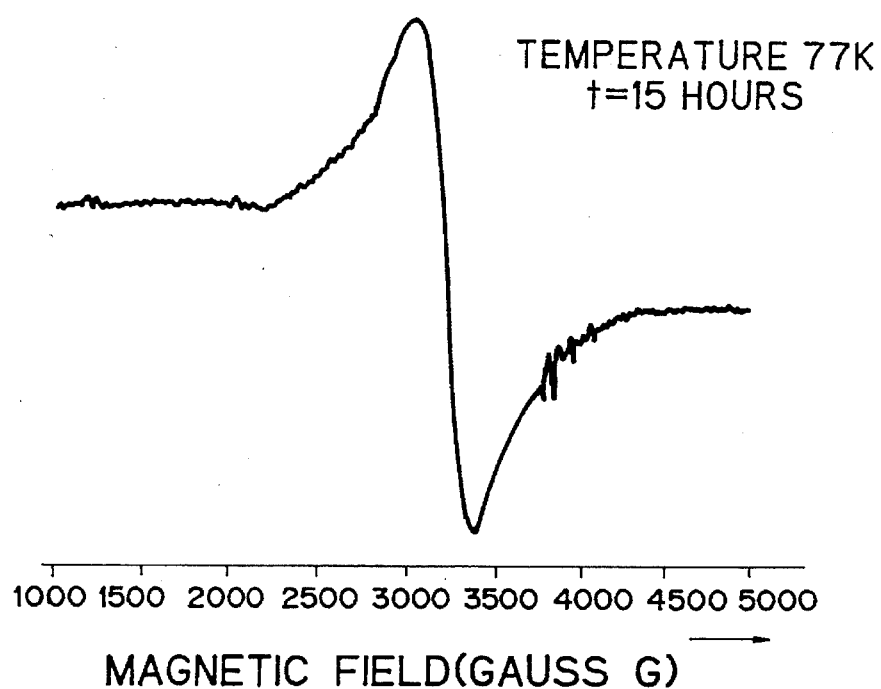
Figure 16D:
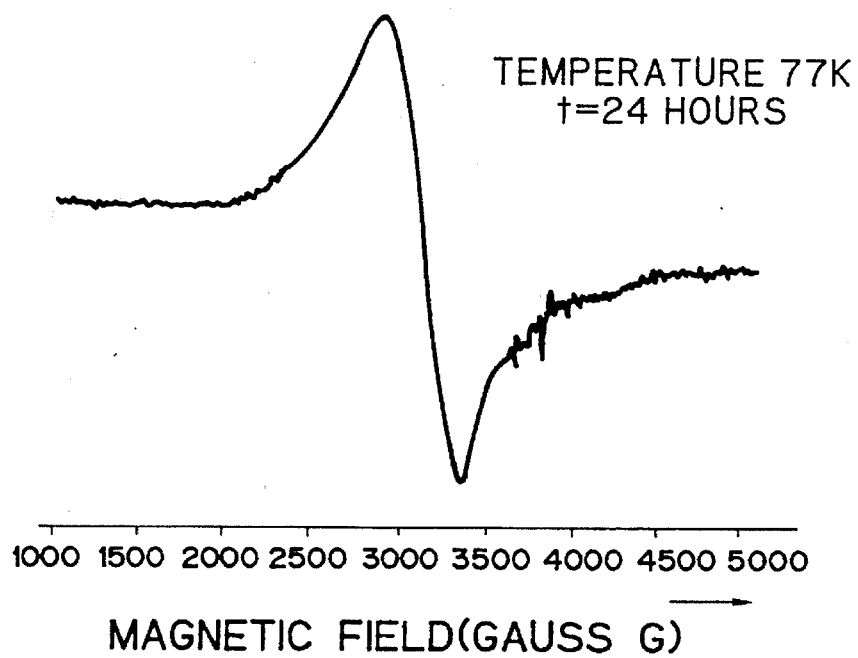

ESR spectrum of the toluene-treated crystalline polymer at 286K and zero time (t=0) is shown in FIG. 16A, and changes in the ESR spectrum at 77K with time are shown in FIGS. 16B to 16D. It is obvious from FIGS. 16A to 16D that a broad signal appeared in the low magnetic field region with time when the polyphenylacetylene was cooled.

Figure 17:
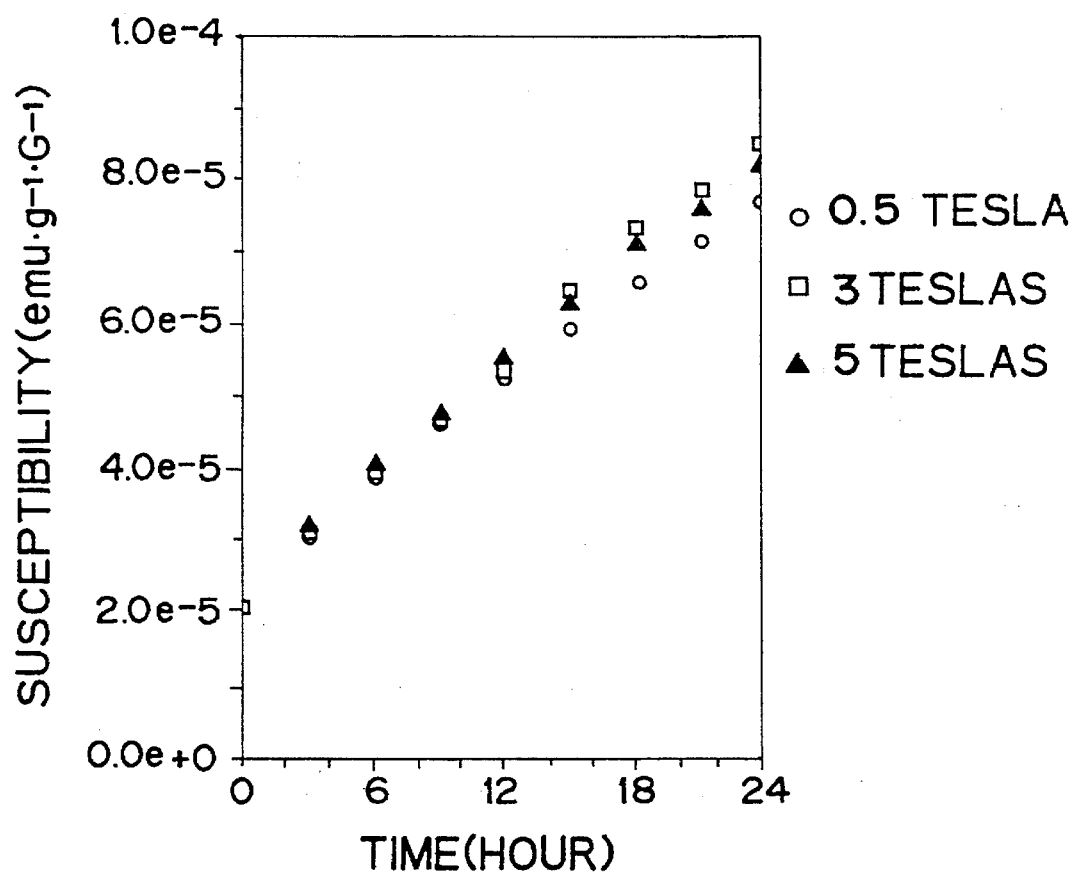
FIG. 17 is a diagram showing relations between the susceptibility and the time in Example 3-3. The temperature condition is 77 K.

Results of measurement of the susceptibility of the crystalline polymer with time at 77K and magnetic fields of 0.5 to 5 teslas are shown in FIG. 17. It is obvious from FIG. 17 that the magnetic moment was increased with time by cooling the polyphenylacetylene and was in a high correlation to the susceptibility.

Synthesis Example 4

Poly(4-methoxyphenylacetylene-4-chlorophenylacetylene) copolymer was produced in the same manner as in Synthesis Example 1 except that 1.0 mole of 4-methoxyphenylacetylene and 1.0 mole of 4-chlorophenylacetylene were used in place of 4-methoxyphenylacetylene of synthesis Example 1.

Example 4

The copolymer obtained in Synthesis Example 4 was kept at 77K for 12 hours, and the susceptibility-temperature characteristics of the sample were measured in the same manner as in Example 2-3. It was found that the susceptibility was about 10 times as large as the sample not kept at 77K.

Figure 18A:
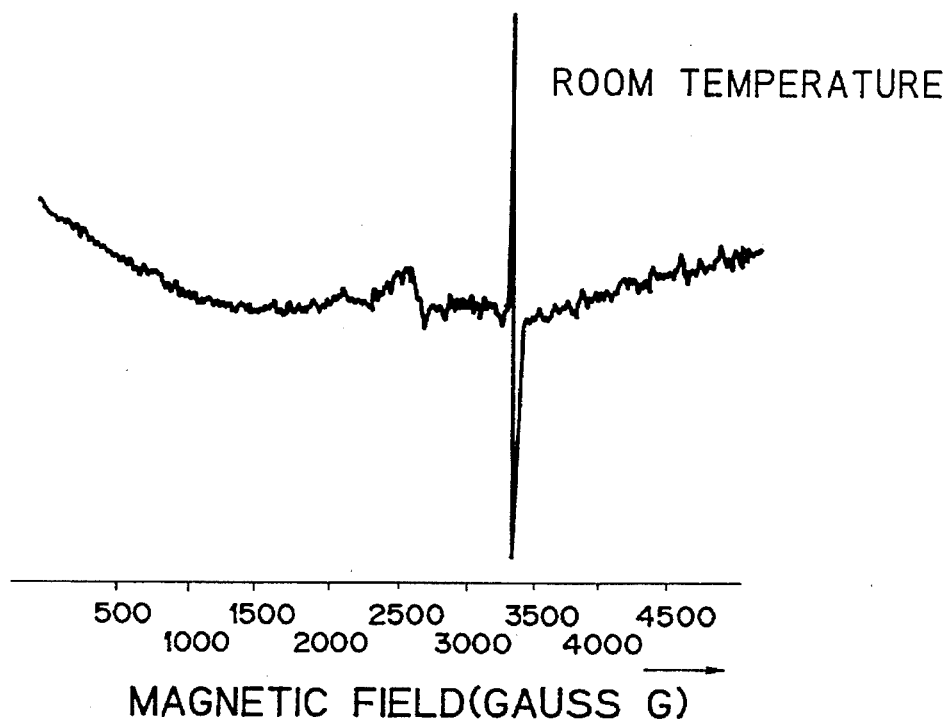
FIGS. 18A, 18B and 18C are ESR spectrum diagrams of the copolymer of Example 4 before and after the heat treatment, respectively. The temperature conditions are room temperature for 18(A) and 77 K for 18(B) and 18(C).
Figure 18B:
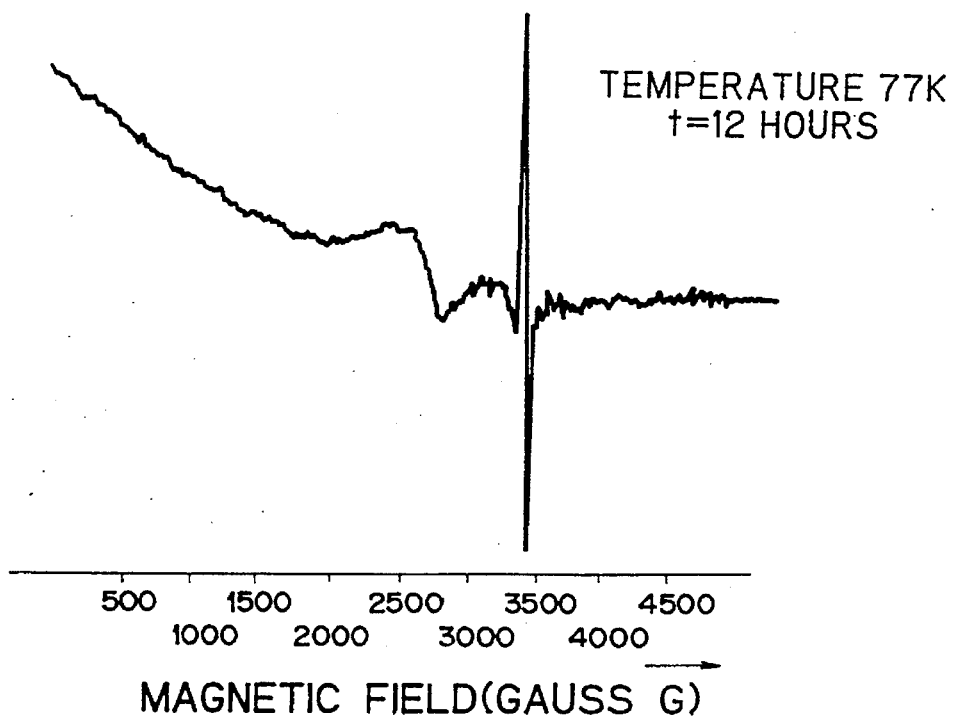
Figure 18C:
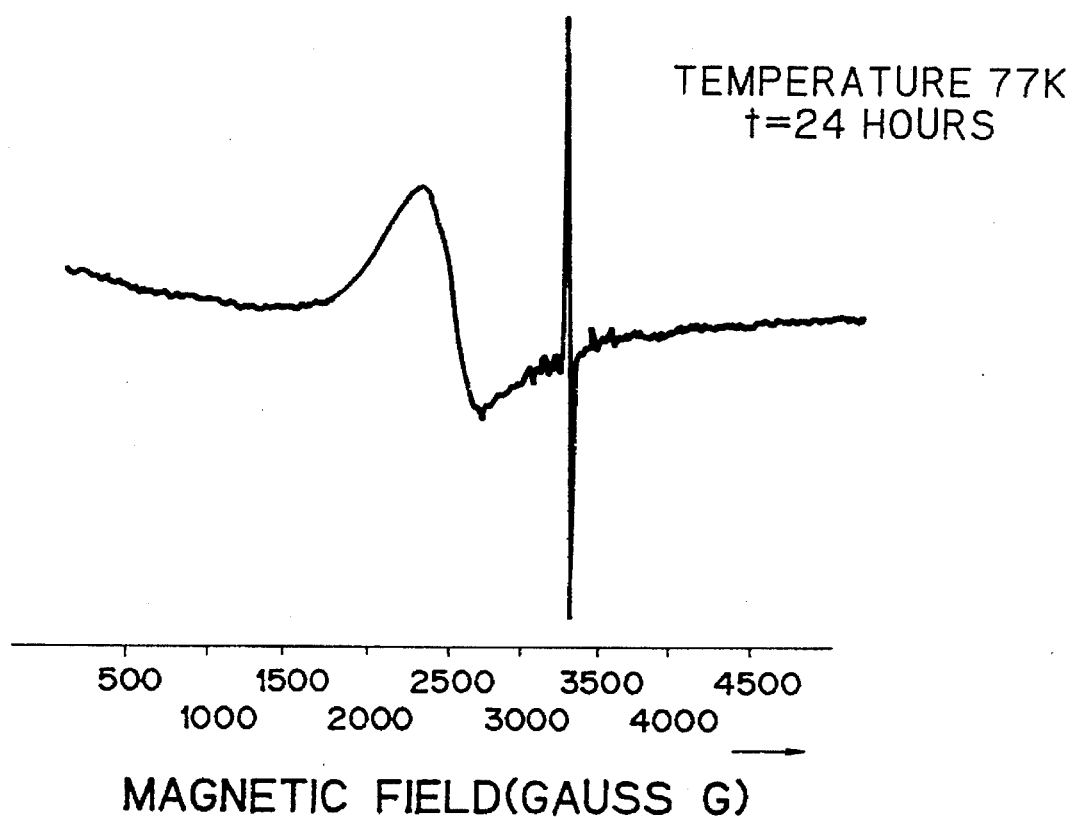

ESR spectrum of the copolymer was measured at room temperature (FIG. 18A), and at 77K with time (FIGS. 18B and 18C). It is obvious from the ESR spectrum of the copolymer in FIGS. 18A to 18C that a broad signal was observed at room temperature in the low magnetic field region, and the broad signal was increased by cooling the copolymer.

What is claimed is:

1. An organic ferromagnetic member, which comprises a polyacetylene compound consisting essentially of repetition units represented by the following general formula (I):

(I)

wherein at least one of $R_1$ and $R_2$ is an unsubstituted aromatic ring or an aromatic ring substituted by a halogen atom or an alkoxy group or unsubstituted aromatic heterocyclic ring or an aromatic heterocyclic ring substituted by a halogen atom or an alkoxy group; n is a positive integer; and said polyacetylene compound being ferromagnetic.

2. An organic ferromagnetic member, which comprises a polyacetylene compound consisting essentially of repetition units represented by the following general formula (I):

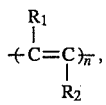
(I)

wherein at least one of $R_1$ and $R_2$ is an unsubstituted aromatic ring or an aromatic ring substituted by a halogen atom or an alkoxy group or unsubstituted aromatic heterocyclic ring or an aromatic heterocyclic ring, substituted by a halogen atom or an alkoxy group; and n is a positive integer, said polyacetylene compound being brought to a temperature $T_1$ and then kept in a range of the temperature $T_1$ to a temperature $T_2$ for a given time to exhibit a ferromagnetism, where $T_1 \leq T_2 \leq T_c$, and where $T_c$ is the Curie temperature of the polyacetylene compound which is ferromagnetic.

3. A time-determinative organic ferromagnetic member which comprises a polyacetylene compound consisting essentially of a compound having repetition units represented by the following general formula (I):

wherein at least one of $R_1$ and $R_2$ is an unsubstituted aromatic ring or an aromatic ring substituted by a halogen atom or an alkoxy group, or an unsubstituted aromatic heterocyclic ring or an aromatic heterocyclic ring substituted by a halogen atom or an alkoxy group; and n is a positive integer, said polyacetylene compound being brought to a temperature $T_1$ and kept in a temperature range of $T_1$ to $T_2$ for a given time, where $T_1 \leq T_2 \leq T_c$, and where $T_c$ is the Curie temperature of the polyacetylene compound which is ferromagnetic, thereby developing a ferromagnetism after the given time at said temperature $T_2$, and said given time being determined by the substituted or unsubstituted aromatic ring or the substituted or unsubstituted heterocyclic ring, said time being at least 5 minutes and said temperature $T_2$ being no more than 115K.

4. An organic ferromagnetic member according to claim 2, 3 or 1, wherein said polyacetylene compound is a copolymer.

5. An organic ferromagnetic member according to claim 2, 3 or 1, wherein said polyacetylene compound is selected from the group consisting of poly (4-methoxyphenylacetylene), poly (4-chlorophenylacetylene) and polyphenylacetylene.

6. An organic ferromagnetic member, which consists essentially of repetition units represented by the following general formula (I):

wherein at least one of $R_1$ and $R_2$ is an unsubstituted aromatic ring or an aromatic ring substituted by a halogen atom or an alkoxy group or unsubstituted aromatic heterocyclic ring, or an aromatic heterocyclic ring substituted by a halogen atom or an alkoxy group and when any one of $R_1$ and $R_2$ is the substituent as recited above the other substituent is a hydrogen atom, wherein the organic ferromagnetic member having a ferromeganitism has an absorbance at a lower magnetic field side in the electron spin resonance spectrum than the absorbance due to the paramegnetic radical shown by the organic magnetic member of ordinary temperature, and n is a positive integer.

7. An organic ferromagnetic member, which consists essentially of repetition units represented by the following general formula (I):

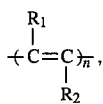

wherein at least one of $R_1$ and $R_2$ is an unsubstituted aromatic ring or an aromatic ring substituted by a halogen atom or an alkoxy group or an unsubstituted aromatic heterocyclic ring or an aromatic heterocyclic ring, substituted by a halogen atom or an alkoxy group and when any one of $R_1$ and $R_2$ is the substituent as recited above, the other substituent is a hydrogen atom; and n is a positive integer, said organic ferromagnetic compound having an electron spin resonance spectrum having an absorbance on a lower magnetic field side than that due to paramagnetic radical and wherein said organic ferromagnetic member has a spin density of at least $10^{17}$ spins/g.

8. An organic ferromagnetic member, which comprises a polyacetylene compound consisting essentially of repetition units represented by the following general formula (I):

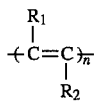

wherein at least one of $R_1$ and $R_2$ is an unsubstituted aromatic ring, or an aromatic ring substituted by a halogen atom or an alkoxy group or an unsubstituted aromatic heterocyclic ring, or an aromatic heterocyclic ring substituted by a halogen atom or an alkoxy group; and n is a positive integer, wherein said compound has an electron spin resonance spectrum having an absorbance on a lower magnetic field side than that due to paramagnetic radical, and has a spin density of at least $10^{17}$ spins/g.

9. A process for producing an organic ferromagnetic member, which comprises bringing a polyacetylene compound consisting essentially of repetition units represented by the following general formula (I):

wherein at least one of $R_1$ and $R_2$ is an unsubstituted aromatic ring or an aromatic ring substituted by a halogen atom or an alkoxy, group or an unsubstituted aromatic heterocyclic ring or an aromatic heterocyclic ring, substituted by a halogen atom or an alkoxy group; and n is a positive integer, bringing said polyacetylene compound to a first temperature, and then bringing said polyacetylene compound to a second temperature which is higher than the first temperature and equal to or lower than the Curie temperature of the polyacetylene compound, and then returning to the first temperature.

10. A process according to claim 9, wherein the second temperature is not more than 115K.

* * * * *

UNITED STATES PATENT AND TRADEMARK OFFICE
CERTIFICATE OF CORRECTION

PATENT NO. : 5,461,132
DATED : October 24, 1995
INVENTOR(S) : MASAYOSHI TABATA, ET AL.

Page 1 of 3

It is certified that error appears in the above-indentified patent and that said Letters Patent is hereby corrected as shown below:

ON TITLE PAGE

In [56] References Cited, under OTHER PUBLICATIONS:
In "Y.V. Korshak et al.", "370∝372," should read
--370-372,--.
In "World Patents Index", "ltd.," should read --Ltd.,--.

COLUMN 1

Line 35, "et al" should read --et al.,--.
Line 41, "et al" should read --et al.,--.
Line 58, "eliminate" should read --eliminates--.

COLUMN 2

Line 3, "Still" should read --A still--.

COLUMN 4

Line 19, "Poly(4-" should read --poly(4- --.
Line 22, "Poly(4-" should read --poly(4- --.
Line 27, "Poly(4-" should read --poly(4- --.
Line 41, "Poly(4-" should read --poly(4- --.

COLUMN 5

Line 14, "[I]and" should read --[I] and--.
Line 66, "[III]or" should read --[III] or--.

COLUMN 6

Line 14, "[V]or" should read --[V] or--.

UNITED STATES PATENT AND TRADEMARK OFFICE
CERTIFICATE OF CORRECTION

PATENT NO. : 5,461,132
DATED : October 24, 1995
INVENTOR(S) : MASAYOSHI TABATA, ET AL.

It is certified that error appears in the above-indentified patent and that said Letters Patent is hereby corrected as shown below:

COLUMN 6

Line 52, "6trimethox-" should read --6-trimethox- --.
Line 59, "2,6dimethyl" should read --2,6-dimethyl--.

COLUMN 7

Line 6, "2,4,6tricyanophenylacetylene," should read
--2,4,6-tricyanophenylacetylene,--.

COLUMN 8

Line 3, "Mo(CO)$_6$—CCl$_4$hv" should read --Mo(CO)$_6$—CCl$_4$ hv--.
Line 11, "usualy" should read --usually--.

COLUMN 11

Line 52, "100 . KHz" should read --100KHz--.
Line 63 should be deleted.

COLUMN 14

Line 6, "Example $_2$-3" should read --Example 2-3--.
Line 14, "Example 3°" should read --Example 3--.
Line 52, "momentmagnetic" should read --moment-magnetic--.

COLUMN 16

Line 59, "ferromeganitism" should read --ferromagnetism--.
Line 61, "paramegnetic" should read --paramagnetic--.

UNITED STATES PATENT AND TRADEMARK OFFICE
CERTIFICATE OF CORRECTION

PATENT NO. : 5,461,132
DATED : October 24, 1995
INVENTOR(S) : MASAYOSHI TABATA, ET AL.

It is certified that error appears in the above-indentified patent and that said Letters Patent is hereby corrected as shown below:

COLUMN 17

Line 17, "to" should read --to the--.

COLUMN 18

Line 1, "ring," should read --ring--.
Line 5, "to" should read --to the--.
Line 19, "alkoxy," should read --alkoxy--.

Signed and Sealed this

Sixteenth Day of April, 1996

Attest:

BRUCE LEHMAN

Attesting Officer

Commissioner of Patents and Trademarks